(12) United States Patent
Ito

(10) Patent No.: US 9,172,841 B2
(45) Date of Patent: Oct. 27, 2015

(54) IMAGE PROCESSING DEVICE, AND IMAGE PROCESSING SYSTEM AND COMPUTER-READABLE MEDIUM THEREFOR

(71) Applicant: BROTHER KOGYO KABUSHIKI KAISHA, Nagoya-shi, Aichi-ken (JP)

(72) Inventor: Chitoshi Ito, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/340,051

(22) Filed: Jul. 24, 2014

(65) Prior Publication Data

US 2015/0029560 A1 Jan. 29, 2015

(30) Foreign Application Priority Data

Jul. 25, 2013 (JP) .................................. 2013-154328

(51) Int. Cl.
| | |
|---|---|
| *H04N 1/387* | (2006.01) |
| *H04N 1/40* | (2006.01) |
| *H04N 1/00* | (2006.01) |
| *H04N 1/62* | (2006.01) |
| *G06F 3/12* | (2006.01) |

(52) U.S. Cl.
CPC ......... *H04N 1/3872* (2013.01); *H04N 1/00244* (2013.01); *H04N 1/40* (2013.01); *H04N 1/626* (2013.01); *H04N 2201/0094* (2013.01)

(58) Field of Classification Search
CPC ... H04N 1/3872; H04N 1/00244; H04N 1/40; H04N 1/626; H04N 2201/0094
See application file for complete search history.

(56) References Cited

U.S. PATENT DOCUMENTS

| | | | |
|---|---|---|---|
| 6,738,154 B1* | 5/2004 | Venable | G06K 9/32 358/1.15 |
| 2010/0002256 A1* | 1/2010 | Aso | G06K 15/02 358/1.15 |

FOREIGN PATENT DOCUMENTS

JP 2008-092317 A 4/2008

* cited by examiner

*Primary Examiner* — Quang N Vo
(74) *Attorney, Agent, or Firm* — Merchant & Gould PC

(57) ABSTRACT

An image processing device including an image information acquirer and a control device configured to detect encircling lines written on a document sheet, based on acquired image information, determine an arrangement order of a partial image formed within each encircling line, detect first symbols each written on the document sheet and added to a corresponding partial image, the first symbols relating to how to lay out the partial images, determine a layout of the partial images based on the arrangement orders and the first symbols, extract, from the image information, a plurality of pieces of image information each of which is image information of a partial image within a corresponding encircling line, and generate layout image information in which the pieces of image information are arranged according to the layout.

20 Claims, 17 Drawing Sheets

IMAGE PROCESSING DEVICE, AND IMAGE PROCESSING SYSTEM AND COMPUTER-READABLE MEDIUM THEREFOR

CROSS-REFERENCE TO RELATED APPLICATION

This application claims priority under 35 U.S.C. §119 from Japanese Patent Application No. 2013-154328 filed on Jul. 25, 2013. The entire subject matter of the application is incorporated herein by reference.

BACKGROUND

1. Technical Field

The following description relates to one or more aspects for image processing devices, and methods and computer-readable media therefor.

2. Related Art

A known image reading-recording apparatus is configured to scan an image on a sheet by using an image scanner thereof. The image formed on the sheet includes a handwritten frame and an image ID placed within the handwritten frame. The image reading-recording apparatus is further configured to generate a synthetized image that includes the handwritten frame with a particular image corresponding to the image ID and to output the generated synthetized image.

According to the known image reading-recording apparatus, the sheet with the handwritten frame and the image number thereon is prepared separately from the image to be put within the handwritten frame. Therefore, in order to place a plurality of images in accordance with a desired layout, it is required to carry out troublesome operations that include initially writing a plurality of handwritten frames according to the desired layout, and then writing, within each handwritten frame, an image number corresponding to an image to be fitted within each individual handwritten frame.

SUMMARY

Aspects of the present disclosure are advantageous to provide one or more improved techniques that make it possible to easily generate an output image with a plurality of images arranged according to a desired layout.

According to aspects of the present disclosure, an image processing device is provided, which includes an image information acquirer configured to acquire image information of an image read out of a document sheet, and a control device configured to detect a plurality of encircling lines written on the document sheet, based on the acquired image information, determine an arrangement order of a partial image formed within each of the detected plurality of encircling lines, detect one or more first symbols each written on the document sheet and added to a corresponding one of the partial images, the one or more first symbols relating to how to lay out the partial images, determine a layout of the partial images based on the determined arrangement orders and the detected one or more first symbols, extract, from the acquired image information, a plurality of pieces of image information each of which is image information of the partial image, and generate layout image information in which the extracted plurality of pieces of image information are arranged according to the determined layout.

According to aspects of the present disclosure, further provided is an image processing system, which includes an image scanner configured to obtain image information of an image on a document sheet, and a control device configured to detect a first encircling line on the document sheet based on the obtained image information, extract, from the obtained image information, first partial image information corresponding to a first partial image formed within the first encircling line, detect a particular symbol relative to the detected first encircling line, associate the first partial image information with the first symbol, the first partial image information and the particular symbol being related to the detected first encircling line, determine a first output coordinate where the first partial image is reproduced on a sheet based on the particular symbol, generate first output image information including the first partial image information and the particular coordinate, and output the generated first output image information.

According to aspects of the present disclosure, further provided is a non-transitory computer-readable medium storing computer-readable instructions that are executable by a processor coupled with an image information acquirer configured to acquire image information of an image read out of a document sheet, the instructions being configured to, when executed by the processor, cause the processor to detect a plurality of encircling lines written on the document sheet, based on the acquired image information, determine an arrangement order of a partial image formed within each of the detected plurality of encircling lines, detect one or more first symbols each written on the document sheet and added to a corresponding one of the partial images, the one or more first symbols relating to how to lay out the partial image, determine a layout of the partial images based on the determined arrangement orders and the detected one or more first symbols, extract, from the acquired image information, a plurality of pieces of image information each of which is image information of the partial image, and generate layout image information in which the extracted plurality of pieces of image information are arranged according to the determined layout.

It is noted that, in the present disclosure, the term "information" may be used as a broader concept than the term "data." Therefore, for instance, "A data" may be replaced with "A information." Further, "B data," which is a copy of "A data" or generated by converting "A data," may be equivalent to "A information," as far as "B data" is used as having the same meaning as "A data."

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1A:
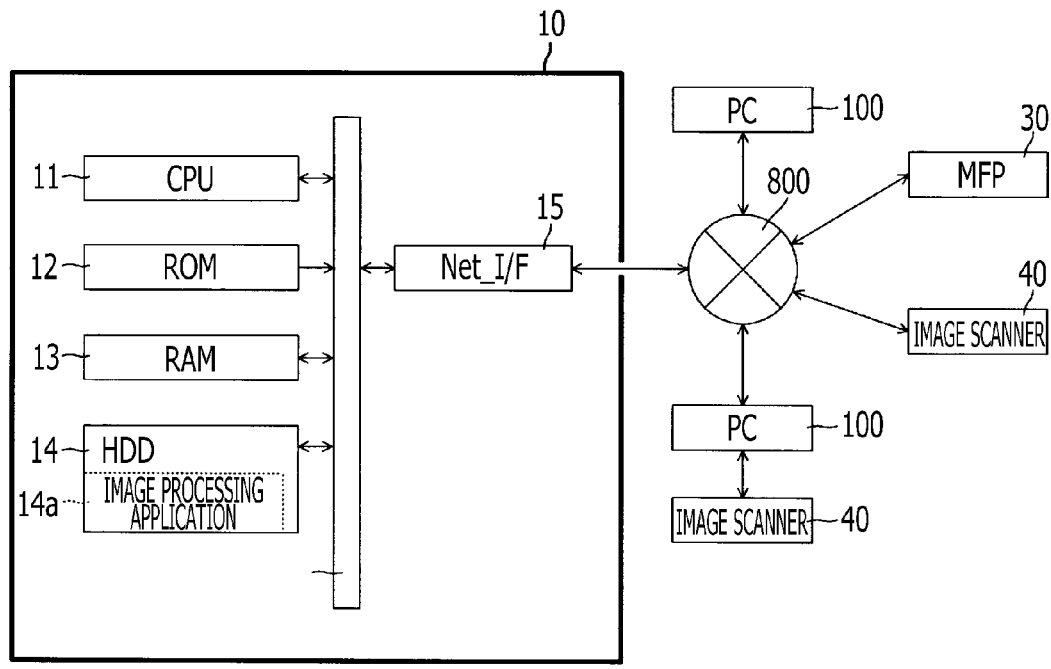
FIG. 1A is a block diagram showing an electrical configuration of a server in an illustrative embodiment according to one or more aspects of the present disclosure.

FIG. 1A is a block diagram showing an electrical configuration of a server 10 in an illustrative embodiment. The server 10 is configured to, when receiving image data generated by reading a document sheet on which there is a frame handwritten by a user, detect the handwritten frame from the read image data and place an image in the handwritten frame in accordance with a predetermined layout. In the following description, a frame handwritten by the user may be referred to as a "handwritten frame" or a "frame." Further, image data generated by reading a document sheet may be referred to as "read image data."

The server 10 includes a central processing unit 11 (hereinafter referred to as a CPU 11), a read-only memory 12 (hereinafter referred to as a ROM 12), a random access memory 13 (hereinafter referred to as a RAM 13), a hard disk drive 14 (hereinafter referred to as an HDD 14), and a network interface 15. Hereinafter, the network interface 15 may be referred to as the Net_I/F 15 (e.g., see FIG. 1). The above elements are interconnected via a bus line 16. The CPU 11 is configured to control each element connected with the bus line 16, in accordance with fixed values and computer programs stored in the ROM 12 and the HDD 14 and data stored in the RAM 13.

The ROM 12 is a non-rewritable non-volatile memory configured to store programs for controlling operations of the server 10. The RAM 13 is a rewritable volatile memory configured to temporarily store information necessary for processing by the CPU 11.

The HDD 14 is a rewritable non-volatile storage device. The HDD 14 stores an operating system (not shown) and an image processing application 14a. The image processing application 14a is for processing read image data received externally via a network 800. As will be described in detail later, the image processing application 14a of the illustrative embodiment is configured to detect a handwritten frame from read image data as received, extract an image placed within the detected handwritten frame from the read image data, and place the extracted image in accordance with a predetermined layout. Operations in below-mentioned flowcharts shown in FIGS. 5 to 10 are performed by the CPU 11 in accordance with the image processing application 14a. It is noted that, in the following description, the CPU that is executing a program such as the image processing application 14a or the operating system may simply be referred to as a name of the program. For example, there may be a case where "the image processing application" represents "the CPU that is executing the image processing application."

It is noted that programs such as the image processing application 14a may be stored in computer-readable media, which are non-transitory storage media but do not include electric signals as carrier waves carrying a program downloaded from a server on the Internet. The computer-readable media may include but not be limited to random access memories (hereinafter referred to as RAMs), read-only memories (hereinafter referred to as ROMs), electrically erasable programmable read-only memories (hereinafter referred to as EEPROMs), hard disk drives (hereinafter referred to as HDDs), buffers provided to the CPU 11, and a combination including two or more of the aforementioned storage media.

The network interface 15 is configured to connect the server 10 with the network 800. The server 10 is allowed to connect with a multi-function peripheral 30 (hereinafter referred to as an MFP 30), image scanners 40, and personal computers 100 (hereinafter referred to as PCs 100) via the network 800 that is connected with the server 10 via the network interface 15. The MFP 30 has multiple functions such as a printing function, a facsimile function, and a copy function, as well as a scanning function to read a document sheet. Each image scanner 40 has a scanning function alone.

Hence, the server 10 is allowed to receive read image data corresponding to a document sheet read by one of the MFP 30 and the image scanners 40, from one of the MFP 30, the image scanners 40, and the PCs 100 connected with the MFP 30 or the image scanners 40. Further, the server 10 is allowed to receive, from the PCs 100, read image data stored in the PCs 100.

Figure 1B:
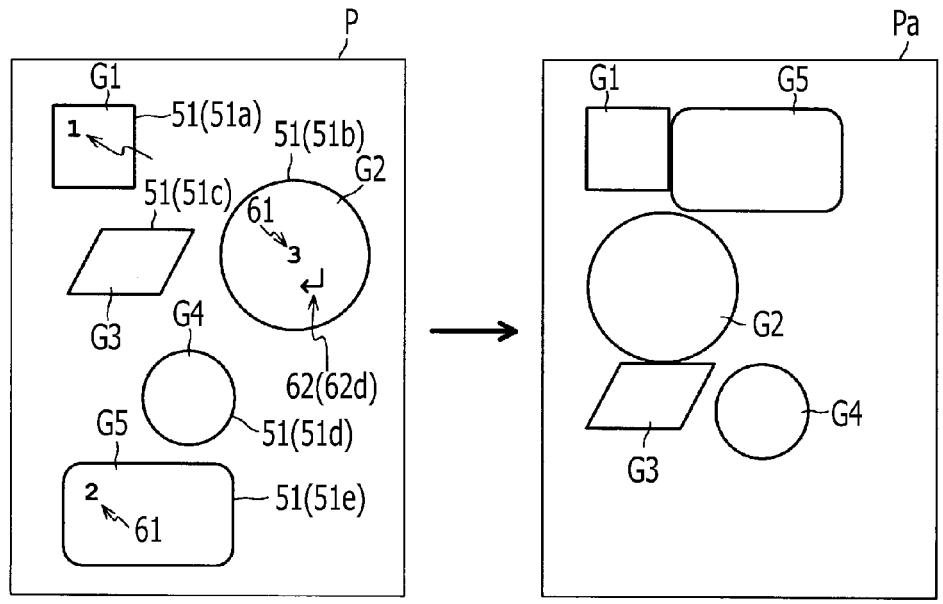
FIG. 1B is for illustrating a general technical concept to determine a layout of images in the illustrative embodiment according to one or more aspects of the present disclosure.

A general technical concept of the present disclosure will be described with reference to FIG. 1B. On a left side of FIG. 1B, exemplified is a document sheet P on which there are handwritten frames 51 written by the user. In this example, five frames 51 (51a to 51e) are handwritten on the document sheet P. Within three frames 51a, 51b, and 51e of the five frames 51, numeric characters as order specifying numbers 51 are handwritten by the user. Further, in the frame 51b, an action specifying symbol 62 is handwritten by the user. In the example shown in FIG. 1B, a line feed symbol 62d is written as one of action specifying symbols 62. In the illustrative embodiment, the frames 51, the order specifying numbers 61, and the action specifying symbols 62 are written on the document sheet with a previously-determined color (e.g., red).

When receiving the read image data of the document sheet P, the server 10 processes the received read image data in accordance with the image processing application 14a. As will be described in detail later, the server 10 detects the handwritten frames 51 (51a to 51e) from the received read image data of the document sheet P, and extracts images G1 to G5 within areas of the detected frames 51a to 51e, respectively. Then, the server 10 places the extracted images G1 to G5 within a page Pa in accordance with a predetermined layout. It is noted that the layout is determined based on arrangement coordinates of the frames 51, the order specifying numbers 61 written in the frames 51, and the action specifying symbol(s) 62 written in the frame(s) 51. Explanations will be provided below about a specific method for determining a layout based on the order specifying numbers 61 and various types of action specifying symbols 62 including the line feed symbol 62d, with reference to FIGS. 2 to 5.

Figure 2:
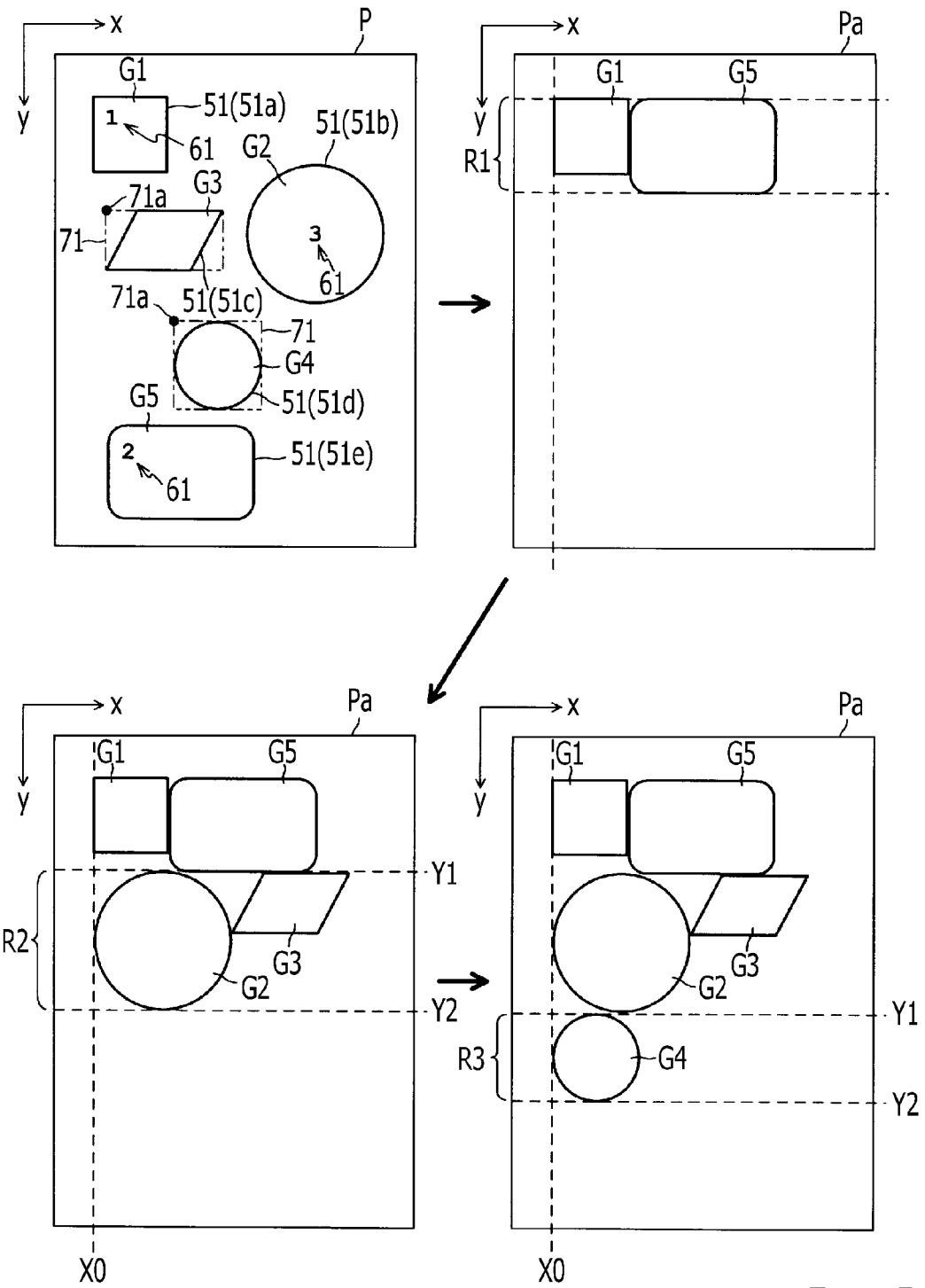
FIG. 2 is for illustrating a method to determine a layout of images based on order specifying numbers in the illustrative embodiment according to one or more aspects of the present disclosure.

Subsequently, referring to FIGS. 2 to 5, a method for determining a layout will be provided. FIG. 2 is for illustrating a method to determine a layout based on the order specifying numbers 61. It is noted that, in FIG. 2, there is not an action specifying symbol 62 written in any of the frames 51. In the illustrative embodiment, the frames 51 with the order specifying numbers 61 written therein are preferentially arranged earlier than the other frames 51 without any order specifying numbers 61 written therein. Therefore, as shown in an upper left section of FIG. 2, when the order specifying numbers 61 are written only in the frames 51a, 51b, and 51e of the five frames 51a to 51e written on the document sheet P, the frames 51a, 51b, and 51e are preferentially arranged earlier than the other frames 51c and 51d. Accordingly, the images G1, G2, and G3, of the five images G1 to G5 corresponding to the five frames 51, are preferentially arranged earlier than the images G3 and G4.

Arrangement orders of the frames 51a, 51b, and 51e with the order specifying numbers 61 written therein correspond to the order specifying numbers 61. In the illustrative embodiment, a smaller order specifying number 61 represents an earlier arrangement order. In the example shown in FIG. 2, the arrangement orders of the frames 51a, 51b, and 51e are determined such that the frame 51a with "1" as the order specifying number 61 is provided with the first arrangement order, and the frame 51b with "3" as the order specifying number 61 is provided with the last (third) arrangement order. Thus, the images G1, G2, and G5 are arranged in the order of the image G1, the image G5, and the image G2. Hence, as shown in an upper right section of FIG. 2, initially, an upper left end of the image G1 is placed at coordinates defined with a coordinate Y0 as a y-coordinate of an upper end of the page Pa and a coordinate X0 as an x-coordinate of a left end of the page Pa.

Next, the image G5 is disposed right adjacent to the image G1 in an x-axis direction (along a horizontal direction), such that an upper end of the image G5 positionally coincides with an upper end of the image G1 in the vertical direction, i.e., coincides with a coordinate Y1 (=the coordinate Y0) as a y-coordinate of an upper end of a first line R1.

Subsequently, the image G2 is disposed. When disposed right adjacent to the image G5, the image G2 is not entirely fitted within the page Pa in a left-to-right direction (the x-axis direction). Therefore, the image G2 is disposed in a next new line R2. Specifically, a coordinate resulting from incrementing a coordinate Y2 as a y-coordinate of a lower end of the first line R1 by one is determined as a y-coordinate of an upper end of the second line R2 (i.e., the coordinate Y1). Then, an upper left end of the image G2 is disposed at coordinates defined with the coordinate Y1 of the line R2 and the coordinate X0 (see a lower left section of FIG. 2). The upper left end of the image G2, which is not a rectangle, is an upper left end of a boundary box (hereinafter referred to as a "BBOX") encircling the image G2 (i.e., the frame 51b). It is noted that the BBOX is a minimum rectangle formed to circumscribe (i.e., touch a circumference of) an element such as the image G2 or the frame 51.

Arrangement orders of the frames 51c and 51d without any order specifying numbers 61 written therein are determined depending on coordinates of BBOXes 71 circumscribing the frames 51c and 51d, respectively. In the illustrative embodiment, an image, corresponding to a BBOX 71 having an upper left end 71a at a smaller y-coordinate (i.e., a BBOX 71 located in a higher position on the page Pa), is preferentially placed in an earlier order. Thus, the image G3 corresponding to the frame 51c is placed earlier than the image G4 corresponding to the frame 51d. Regarding images corresponding to BBOXes 71 having upper left ends 71a at the same y-coordinate, an image corresponding to a BBOX 71 having an upper left end 71a at a smaller x-coordinate (i.e., a BBOX 71 located more left) is preferentially placed in an earlier order.

Hence, as shown in a lower left section of FIG. 2, the image G3 is disposed right adjacent to the image G2 in the second line R2, such that upper ends of the images G2 and G3 are aligned along the left-to-right direction (i.e., upper ends of the images G2 and G3 positionally coincide with each other in the vertical direction). When disposed right adjacent to the image G3, the image G4 is not entirely fitted within the page Pa in the left-to-right direction. Therefore, the image G4 is disposed in a next new line R3. Specifically, a coordinate resulting from incrementing the coordinate Y2 as a y-coordinate of a lower end of the line R2 by one is determined as a y-coordinate of an upper end of the line R3 (i.e., the coordinate Y1). Then, an upper left end of the image G4 is disposed at coordinates defined with the coordinate Y1 of the line R3 and the coordinate X0 (see a lower right section of FIG. 2). When an image is disposed in a next new line, but is not fitted within the page Pa in a vertical direction, the image is disposed at an upper left end of a next new page Pa. Subsequent images are sequentially arranged on a next page Pa or further subsequent pages Pa in the same manner as described above.

Figure 3A:
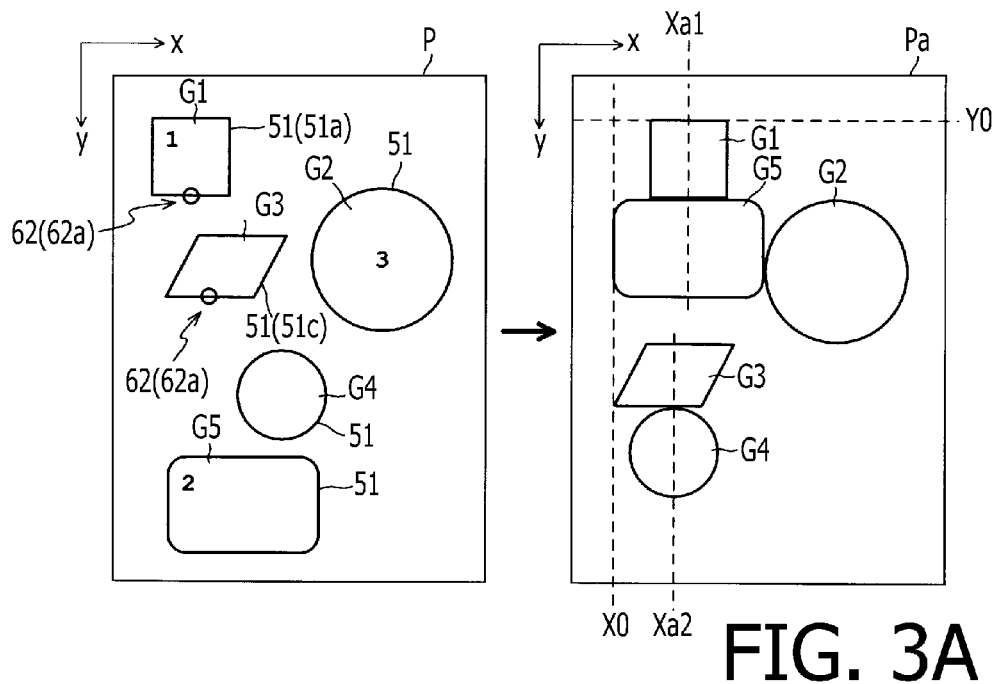
FIG. 3A is for illustrating a method to determine a layout of images based on horizontally-centering symbols when an automatic centering mode is set OFF in the illustrative embodiment according to one or more aspects of the present disclosure.
Figure 3B:
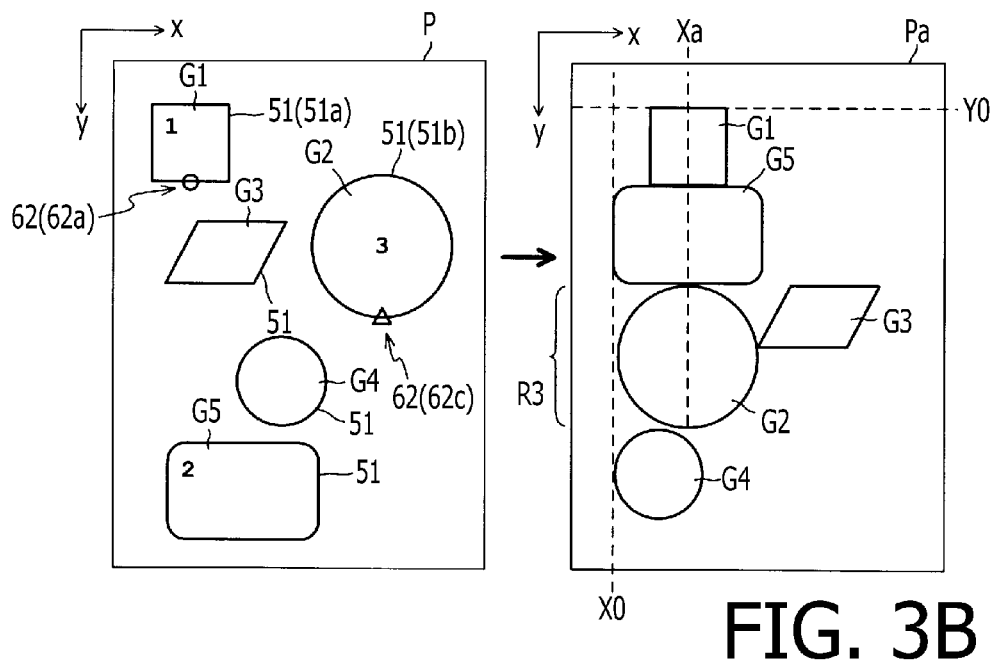
FIG. 3B is for illustrating a method to determine a layout of images based on the horizontally-centering symbol when the automatic centering mode is set ON in the illustrative embodiment according to one or more aspects of the present disclosure.

FIGS. 3A and 3B are for illustrating a method to determine a layout based on a horizontally-centering symbol 62a of the action specifying symbols 62. The horizontally-centering symbol 62a is an action specifying symbol 62 configured to cause images, which are mutually adjacent in the arrangement order, to be arranged along the vertical direction in a "horizontally-centering" manner, i.e., in such a manner that respective center positions of the vertically-arranged images coincide with each other in the horizontal direction (the x-axis direction). In the meantime, below-mentioned "vertically-centering" or "vertically-centering alignment" means to arrange images along the horizontal direction such that respective center positions of the horizontally-arranged images coincide with each other in the vertical direction. In the illustrative embodiment, the horizontally-centering symbol 62a is defined as a circle written in a manner superimposed on a lower side of a frame 51 in a y-axis direction as an arrangement direction of vertically-arranged images on the page Pa.

FIG. 3A is for illustrating a method to determine a layout when an automatic centering mode is set OFF. Further, FIG. 3B is for illustrating a method to determine a layout when the automatic centering mode is set ON. The "automatic centering mode" is a user-settable mode where, based on the horizontally-centering symbol 62a or the below-mentioned vertically-centering symbol 62b (see FIG. 4) written on a frame 51 corresponding to a specific image, subsequent images are automatically center-aligned with reference to the specific image. When the automatic centering mode is set ON, the aforementioned automatic centering alignment is carried out. Meanwhile, when the automatic centering mode is set OFF, an image corresponding to a frame 51 on which one of the centering symbols 62a and 62b is written and another image adjacent to the image in the arrangement order are center-aligned in a direction depending on the centering symbol 62a or 62b (i.e., in a horizontally-centering manner or a vertically-centering manner).

Therefore, as shown in a left section of FIG. 3A, when the automatic centering mode is set OFF, and the horizontally-centering symbol 62a is written on the frame 51a, the image G1 (corresponding to the frame 51a) and the image G5 (which is next to the image G1 in the arrangement order) are arranged in the horizontally-centering manner. In the illustrative embodiment, a leading image of images to be arranged in the horizontally-centering manner is disposed at the left end on the page Pa. Therefore, when a specific image other than an image to be originally placed at the left end on the page Pa is the leading image of the images to be arranged in the horizontally-centering manner, the specific image is disposed at the left end in a next new line on the page Pa or in the first line on a next new page Pa.

As shown in a right section of FIG. 3A, when the image G1 and the image G5 are arranged in the horizontally-centering manner, an x-coordinate (i.e., a coordinate Xa1) of a center for the horizontally-centering alignment is determined on the basis of a larger one of the images G1 and G5 in a size in the left-to-right direction. It is noted that the left-to-right direction is perpendicular to the arrangement direction (i.e., the y-axis direction) along which the images G1 and G5 are arranged in the horizontally-centering manner. In this example, the x-coordinate of the center for the horizontally-centering alignment is determined on the basis of the image G5. In other words, when the image G1 and the image G5 are arranged in the horizontally-centering manner, the x-coordinate of the center for the horizontally-centering alignment is determined as a coordinate (i.e., the coordinate Xa1) of the center in the left-to-right direction of the image G5 to be disposed at the left end on the page Pa. Thus, the image G1 is disposed such that the center position thereof in the left-to-right direction coincides with the coordinate Xa1.

Further, in the example shown in FIG. 3A, the horizontally-centering symbol 62a is written on the frame 51c. Hence, the image G3 (corresponding to the frame 51c) and the image G4 (which is next to the image G3 in the arrangement order) are arranged in the horizontally-centering manner. In this case, in the same manner as the aforementioned case of the images G1 and G5, an x-coordinate (i.e., a coordinate Xa2) of a center for the horizontally-centering alignment of the images G3 and G4 is determined on the basis of the image G3, which is a larger one of the images G3 and G4 in a size in the left-to-right direction that is perpendicular to the arrangement direction (i.e., the y-axis direction) for the horizontally-centering alignment of the images G3 and G4.

In the meantime, as shown in a left section of FIG. 3B, when the automatic centering mode is set ON, and the horizontally-centering symbol 62a is written on the frame 51a, the image G1 (corresponding to the frame 51a) and the images G2 to G5 (which are subsequent to the image G1 in the arrangement order) are arranged in the horizontally-centering manner in accordance with the order specifying number 61 or the y-coordinate of the upper left end of the BBOX 71. When the images to be arranged in the horizontally-centering manner are not entirely fitted within the single page Pa in the vertical direction, one or more images, which are not allowed to be placed within the single page Pa in the vertical direction, are disposed on a next new page Pa. In the illustrative embodiment, one or more images that are not allowed to be placed within the single page Pa in the vertical direction, of the images to be arranged in the horizontally-centering manner, are arranged in the horizontally-centering manner on another page Pa (such as a next new page Pa) as well.

Further, as shown in the left section of FIG. 3B, a centering cancel symbol 62c, which is one of the action specifying symbols 62, is written on the frame 51b. In the illustrative embodiment, the centering cancel symbol 62c is a triangle superimposed on the frame 51. The centering cancel symbol 62c is an action specifying symbol 62 that specifies an end of automatic centering when the automatic centering (the horizontally-centering alignment or the vertically-centering alignment) is implemented in response to the automatic centering mode being set ON.

In the illustrative embodiment, when the centering cancel symbol 62c is written on the frame 51, the automatic centering in execution is terminated regardless of a position of the centering cancel symbol 62c relative to the frame 51. For instance, when the centering cancel symbol 62c is superimposed on a lower side of the frame 51 in the y-axis direction, the centering cancel symbol 62c may specify the end of the horizontally-centering alignment. Thus, depending on the position of the centering cancel symbol 62c relative to the frame 51, the centering cancel symbol 62c may specify a corresponding one of automatic centering alignments (such as the horizontally-centering alignment and the vertically-centering alignment) to be terminated.

When the automatic horizontally-centering alignment is executed with the image G1 as a leading image of images to be arranged in the horizontally-centering manner, based on the horizontally-centering symbol 62a written on the frame 51a, the automatic horizontally-centering alignment in execution is terminated with the image G2 as the final one of the images to be arranged in the horizontally-centering manner (see a right section of FIG. 3B). In this case, the image G3, which is next to the image G2 in the arrangement order, is disposed on a right side of the image G2 in the third line R3, such that upper ends of the images G2 and G3 positionally coincide with each other in the vertical direction (the y-axis direction).

Figure 4A:
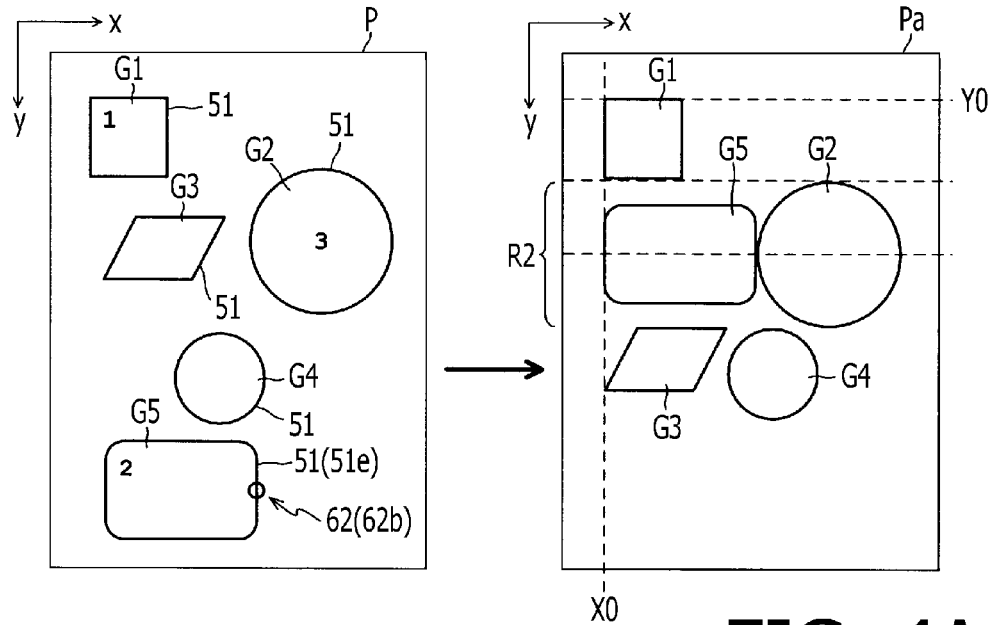
FIGS. 4A and 4B are for illustrating a method to determine a layout of images based on one or more vertically-centering symbols when the automatic centering mode is set OFF in the illustrative embodiment according to one or more aspects of the present disclosure.
Figure 4B:
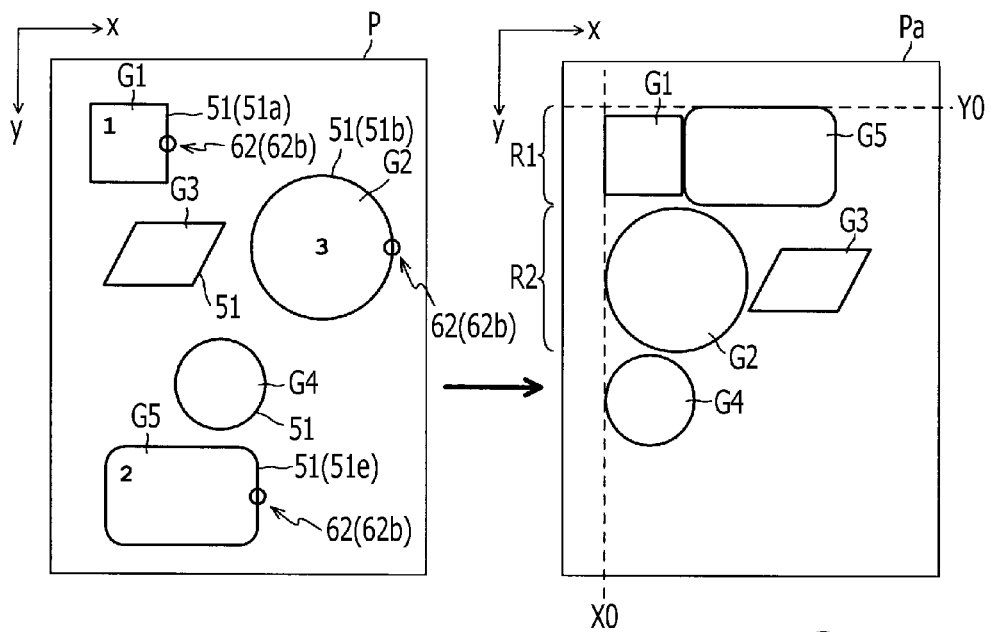

FIGS. 4A and 4B are for illustrating a method to determine a layout based on one or more vertically-centering symbols 62b of the action specifying symbols 62. More specifically, FIGS. 4A and 4B are for illustrating how to determine a layout when the automatic centering mode is set OFF. The vertically-centering symbol 62b is an action specifying symbol 62 configured to cause images, which are mutually adjacent in the arrangement order, to be arranged along the horizontal direction in the "vertically-centering" manner, i.e., in such a manner that respective center positions of the horizontally-arranged images coincide with each other in the vertical direction (the y-axis direction). In the illustrative embodiment, the horizontally-centering symbol 62b is defined as a circle written in a manner superimposed on a right side of a frame 51 in the x-axis direction as an arrangement direction of horizontally-arranged images on the page Pa.

As shown in a left section of FIG. 4A, when the automatic centering mode is set OFF, and the vertically-centering symbol 62b is written on the frame 51e, the image G5 (corresponding to the frame 51e) and the image G2 (which is next to the image 5 in the arrangement order) are arranged in the vertically-centering manner. In the illustrative embodiment, a leading image of images to be arranged in the vertically-centering manner is disposed at the left end on the page Pa. Therefore, when a specific image other than an image to be originally placed at the left end on the page Pa is the leading image of the images to be arranged in the vertically-centering manner, the specific image is disposed at the left end in a next new line on the page Pa or in the first line on a next new page Pa.

As shown in a right section of FIG. 4A, when the image G5 and the image G2 are arranged in the vertically-centering manner, a y-coordinate (i.e., a coordinate Ya) of a center for the vertically-centering alignment is determined on the basis of a larger one of the images G1 and G5 in a size in the vertical direction. It is noted that the vertical direction is perpendicular to the arrangement direction (i.e., the x-axis direction) along which the images G1 and G5 are arranged in the vertically-centering manner. In this example, the y-coordinate of the center for the vertically-centering alignment is determined on the basis of the image G2. In other words, when the image G5 and the image G2 are arranged in the vertically-centering manner, the y-coordinate of the center for the vertically-centering alignment is determined as a coordinate (i.e., the coordinate Ya) of the center in the vertical direction of the image G2 to be disposed such that an upper end of the image G2 coincides with a y-coordinate (i.e., the coordinate Y1) of the upper end of the second line R2. Thus, the image G5 is placed such that the center position thereof in the vertical direction coincides with the coordinate Ya.

Meanwhile, although it is not shown in any drawings, when the automatic centering mode is set ON, a specific image corresponding to a frame 51 with the vertically-centering symbol 62b written thereon, and subsequent images to the specific image in the arrangement order are arranged in the vertically-centering manner in the arrangement order determined based on the order specifying numbers 61 and/or the y-coordinates of the upper left ends 71a of the BBOXes 71. When the images to be arranged in the vertically-centering manner are not entirely fitted within a single line in the left-to-right direction, one or more images, which are not allowed to be placed within the single line in the left-to-right direction, are disposed in a next new line. In the illustrative embodiment, one or more images that are not allowed to be placed within the single line in the left-to-right direction, of the images to be arranged in the vertically-centering manner, are arranged in the vertically-centering manner in another line (such as a next new line) as well.

As shown in a left section of FIG. 4B, when the automatic centering mode is set OFF, and the vertically-centering symbol 62b is written on each of the frames 51a, 51b, and 51e, the vertically-centering alignment according to the vertically-centering symbols 62b is directed to the four images G1, G5, G2, and G3 with the image G1 as a leading image. However, when the four images G1, G5, G2, and G3 are arranged in this order in the vertically-centering manner, as shown in a right section of FIG. 4B, the images G2 and G3 are not fitted within the first line R1 in the left-to-right direction while the images G1 and G5 are fitted within the first line R1 in the left-to-right direction.

In this case, the image G2 is disposed in the next new line R2. The image G3, which is next to the image G2 in the arrangement order, is allowed to be placed within the second line R2 together with the image G2. Therefore, the images G2 and G3 are arranged in the second line R2 in the vertically-centering manner. Namely, although the frame 51e (corresponding to the image G5) has the vertically-centering symbol 62b written thereon, the image G2 (next to the image G5) is not allowed to be fitted within the single line in the left-to-right direction. Therefore, the image arrangement processing is carried out in disregard of the vertically-centering symbol 62b written on the frame 51e.

Figure 5A:
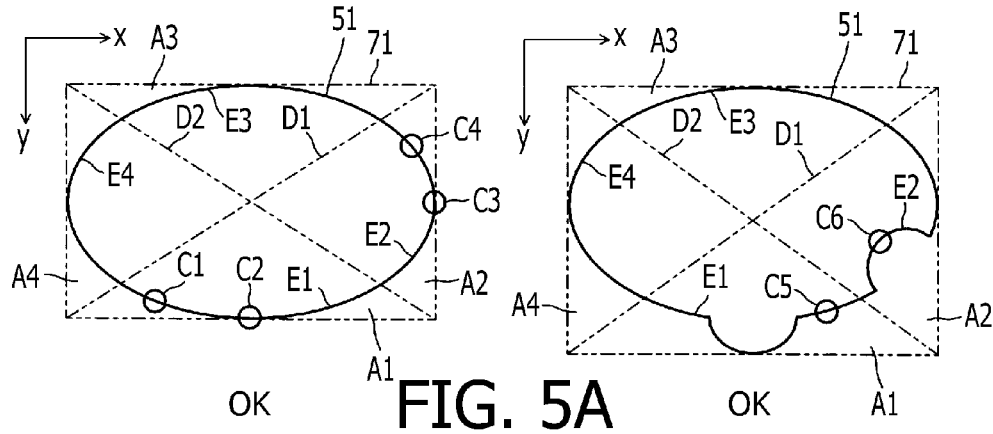
FIGS. 5A and 5B are for illustrating a method to identify the horizontally-centering symbol and the vertically-centering symbol in the illustrative embodiment according to one or more aspects of the present disclosure.
Figure 5B:
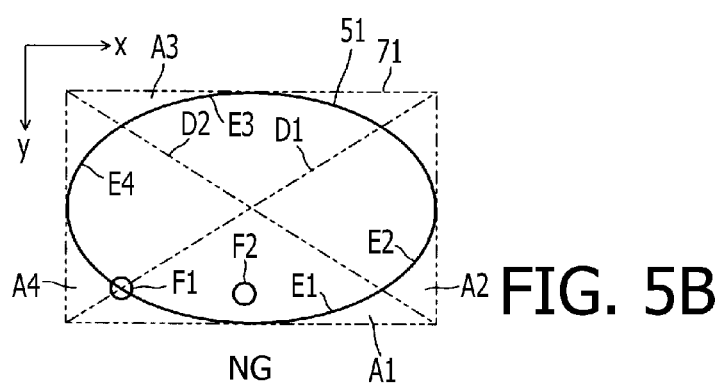

FIGS. 5A and 5B are for illustrating a method to identify the horizontally-centering symbol 62a and the vertically-centering symbol 62b. As described above, in the illustrative embodiment, the horizontally-centering symbol 62a is defined as a circle written in a manner superimposed on a lower side of a frame 51 in the y-axis direction as the arrangement direction of vertically-arranged images on the page Pa. Meanwhile, the vertically-centering symbol 62b is defined as a circle written in a manner superimposed on a right side of a frame 51 in the x-axis direction as the arrangement direction of horizontally-arranged images on the page Pa.

In the illustrative embodiment, each side of the frame 51 in the left-to-right direction and the vertical direction is identified based on four areas A1 to A4 into which the BBOX 71 circumscribing the frame 51 is divided by diagonal lines D1 and D2. Specifically, a line segment E1, contained in the lower area A1, of the frame 51 is defined as a lower side. Additionally, a line segment E3, contained in the upper area A3, of the frame 51 is defined as an upper side. Further, a line segment E2, contained in the right area A2, of the frame 51 is defined as a right side. Moreover, a line segment E4, contained in the left area A4, of the frame 51 is defined as a left side.

Hence, circles C1, C2, and C5 shown in FIG. 5A are treated as the horizontally-centering symbols 62a. Further, circles C3, C4, and C6 shown in FIG. 5A are treated as the vertically-centering symbols 62b. Meanwhile, as shown in FIG. 5B, a circle F1 straddling two areas is not treated as the horizontally-centering symbol 62a or the vertically-centering symbol 62b. Further, a circle (such as a circle F2) that does not overlap the frame 51 is not treated as the horizontally-centering symbol 62a or the vertically-centering symbol 62b.

Thus, according to the illustrative embodiment, each side of the frame 51 (such as the upper side, the lower side, the left side, and the right side) is specified based on the areas A1 to A4 into which the BBOX 71 is divided by the diagonal lines D1 and D2. Therefore, even though the frame 51 has a complex shape as shown in a right section of FIG. 5A, it is possible to accurately detect the horizontally-centering symbol 62a and the vertically-centering symbol 62b.

Further, circles, positioned on the lower side of the frame 51, of the circles written on the frame 51 are treated as the horizontally-centering symbols 62a. Likewise, circles, positioned on the right side of the frame 51, of the circles written on the frame 51 are treated as the vertically-centering symbols 62b. Hence, the user is allowed to select one of the horizontally-centering alignment and the vertically-centering alignment by an intuitive operation of writing a circle on a side of each frame 51 corresponding to a user-desired one of the horizontally-centering alignment and the vertically-centering alignment. In the illustrative embodiment, images are arranged downward (toward the lower side) in the y-axis direction or rightward (toward the right side) in the x-axis direction. Therefore, the circle positioned on the lower side of the frame 51 and the circle positioned on the right side of the frame 51 are treated as the horizontally-centering symbol 62a and the vertically-centering symbol 62b, respectively. Nonetheless, depending on the arrangement direction of the images, the respective sides of the frame 51 on which the horizontally-centering symbol 62a and the vertically-centering symbol 62b are to be written may be changed. For instance, when the images are arranged upward (toward the upper side) in the y-axis direction or leftward (toward the left side) in the x-axis direction, a circle positioned on the upper side of the frame 51 and a circle positioned on the left side of the frame 51 may be treated as the horizontally-centering symbol 62a and the vertically-centering symbol 62b, respectively.

Figure 5C:
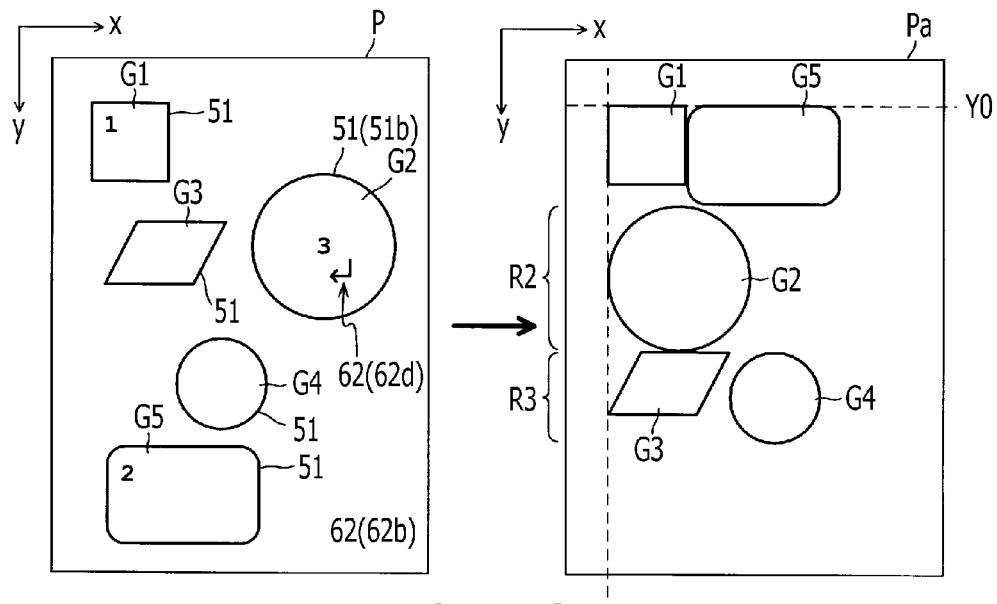
FIG. 5C is for illustrating a method to determine a layout of images based on a line feed symbol in the illustrative embodiment according to one or more aspects of the present disclosure.

FIG. 5C is for illustrating a method to determine a layout based on the line feed symbol 62d of the action specifying symbols 62. The line feed symbol 62d is an action specifying symbol 62 configured to cause an image to be disposed in a new line after a line-feed operation. In the illustrative embodiment, a line feed mark (e.g., a hook-shaped leftward-bent arrow) written within the frame 51 is defined as the line feed symbol 62d. As shown in a left section of FIG. 5C, when the line feed symbol 62d is written within the frame 51b, the image G3 is disposed in a forcibly-started new line. Specifically, in this case, as shown in a right section of FIG. 5C, the image G3, which is next to the image G2 (corresponding to the frame 51b) in the arrangement order, is disposed at the left end in the line R3 next to the line R2.

Figure 6A:
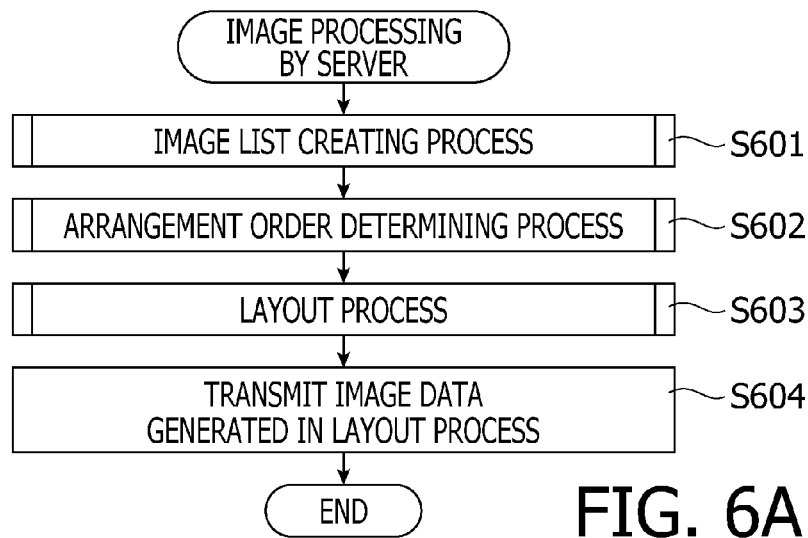
FIG. 6A is a flowchart showing a procedure of image processing to be executed by the server in the illustrative embodiment according to one or more aspects of the present disclosure.

Subsequently, referring to FIGS. 6A to 10, operations to be executed by the server 10 in the illustrative embodiment will be described. FIG. 6A is a flowchart showing a procedure of image processing to be executed by the CPU 11 of the server 10 in accordance with the image processing application 14a. The image processing is launched when the server 10 receives, via the network interface 15, read image data acquired by reading a document sheet P with the MFP 30 or the image scanner 40.

The CPU 11 detects frames 51 written on the document sheet P, and performs an image list creating process to create an image list on which images within the detected frames 51 are listed (S601). The CPU 11 performs an arrangement order determining process to determine an arrangement order of each image on the image list (S602). The CPU 11 performs a layout process to generate image data in which the images on the image list are laid out based on the arrangement orders determined in the arrangement order determining process (S602) and the action specifying symbol 62 assigned to each image (S603). The CPU 11 transmits the image data generated in the layout process (S603) to a predetermined transmission destination (S604). Thereafter, the CPU 11 terminates the image processing. It is noted that, in S604, examples of the predetermined transmission destination may include the PCs 100 and the MFP 30 as a sending source of the read image data.

Figure 6B:
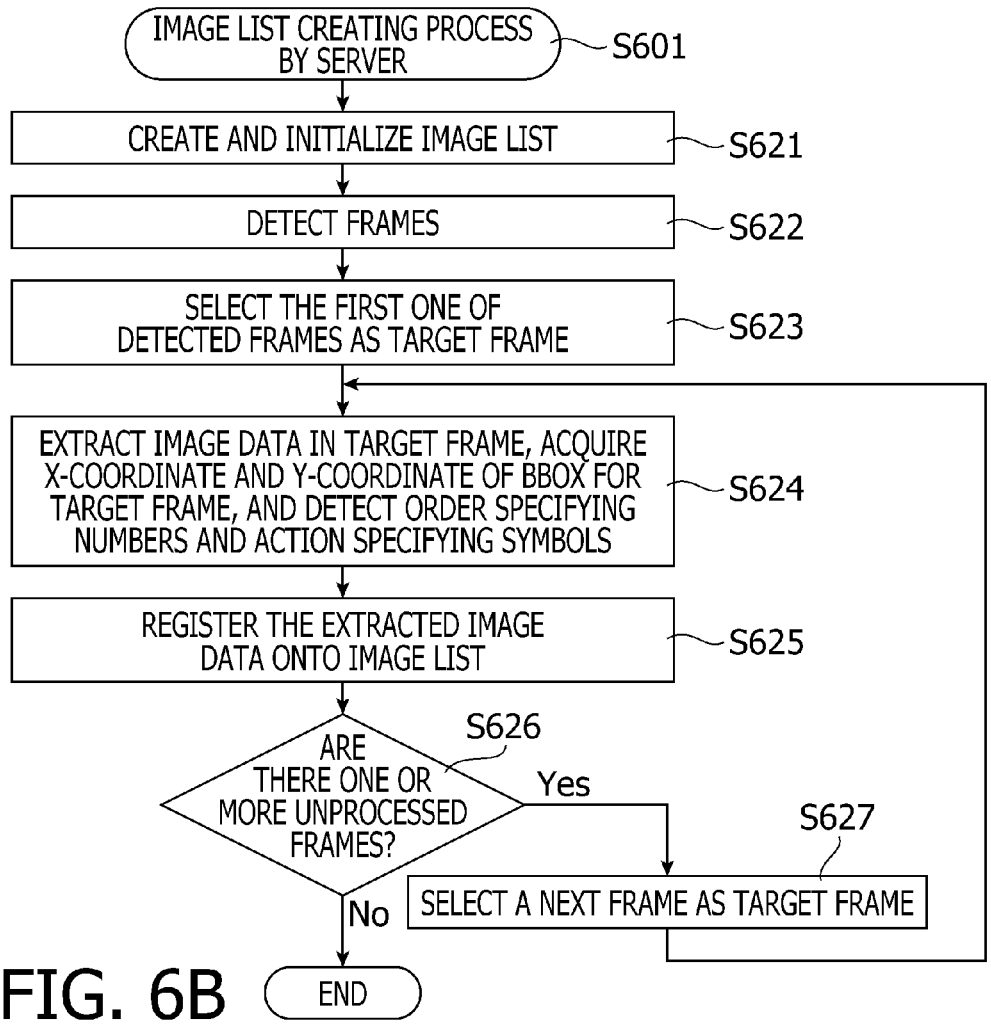
FIG. 6B is a flowchart showing a specific procedure of an image list creating process in the image processing shown in FIG. 6A in the illustrative embodiment according to one or more aspects of the present disclosure.

FIG. 6B is a flowchart showing a specific procedure of the image list creating process (S601). The CPU 11 creates an image list in the RAM 13 and initializes the image list (S621). The CPU 11 analyzes the read image data and detects frames 51 written on the original document sheet P (S622). Specifically, the CPU 11 detects closed line segments with a predetermined color as frames 51. When detecting a line segment that is deemed to be a written frame 51 but not a completely closed line segment (e.g., the detected line segment has open ends), the CPU 11 complements the line segment to create a closed line segment based thereon, and identifies the created closed line segment as a frame 51. The CPU 11 selects the first one of the detected frames 51 as a target frame to be processed (S623).

The CPU 11 extracts, from the read image data, image data contained in the target frame 51 (S624). Further, in S624, the CPU 11 acquires an x-coordinate and a y-coordinate of the read image data of a BBOX 71 for the target frame 51 (more specifically, the CPU 11 acquires an x-coordinate and a y-coordinate of the upper left end 71a of the BBOX 71). Further, in S624, the CPU 11 detects an order specifying number 51 and an action specifying symbol 62 written with the predetermined color, and written in the target frame 51, based on the analysis of the read image data. The CPU 11 may detect an order specifying number 51 and an action specifying symbol 62 written with the predetermined color, and written on the closed line segments.

The CPU 11 registers, onto the image list, the image data extracted in S624, i.e., the image data contained in the target frame 51 (S625). Specifically, the CPU 11 stores, onto the image list, the extracted image data in association with the order specifying number 51 and the action specifying symbol 62 detected in S624. Along with the registration of the extracted image data onto the image list, the CPU 11 corrects the extracted image data with respect to portions corresponding to the frame 51, the order specifying number 61, and the action specifying symbol 62 in the extracted image data, depending on a surrounding color of each of the portions in the extracted image data. Thereby, the CPU 11 acquires image data corresponding to an image that is equivalent to an image on which none of the frame 51, the order specifying number 61, and the action specifying symbol 62 has been written.

In S625, the CPU 11 stores, onto the image list, a value equal to the detected order specifying number 61. Further, the CPU 11 stores data for identifying a type of the detected action specifying symbol 62 (e.g., data for determining whether the detected action specifying symbol 62 is the horizontally-centering symbol 62a or the vertically-centering symbol 62b). When determining that there is not an order specifying number 61 detected in the target frame 51, the CPU 11 stores data (e.g., zero) that represents that there is not an order specifying number 61 detected in the target frame 51. Likewise, when determining that there is not an action specifying number 62 detected in the target frame 51, the CPU 11 stores data (e.g., zero) that represents that there is not an action specifying number 62 detected in the target frame 51.

When determining that there are one or more unprocessed frames in the detected frames 51 (S626: Yes), the CPU 11 selects a next frame 51 as a target frame to be processed (S627). Then, the CPU 11 goes back to S624. Meanwhile, when determining that there is not an unprocessed frame in the detected frames 51 (S626: No), the CPU 11 terminates the image list creating process.

Figure 6C:
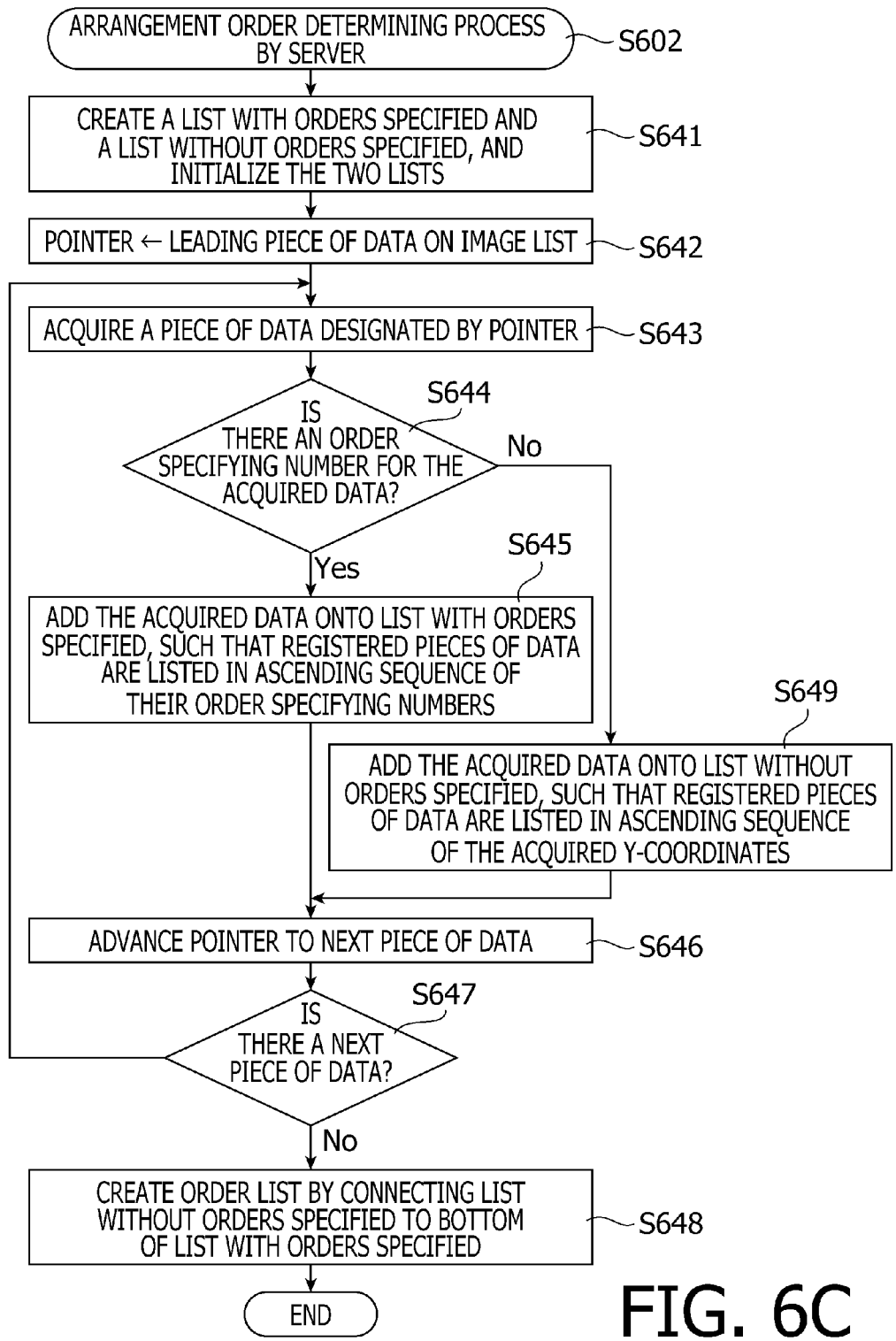
FIG. 6C is a flowchart showing a specific procedure of an arrangement order determining process in the image processing shown in FIG. 6A in the illustrative embodiment according to one or more aspects of the present disclosure.
Figure 7A:
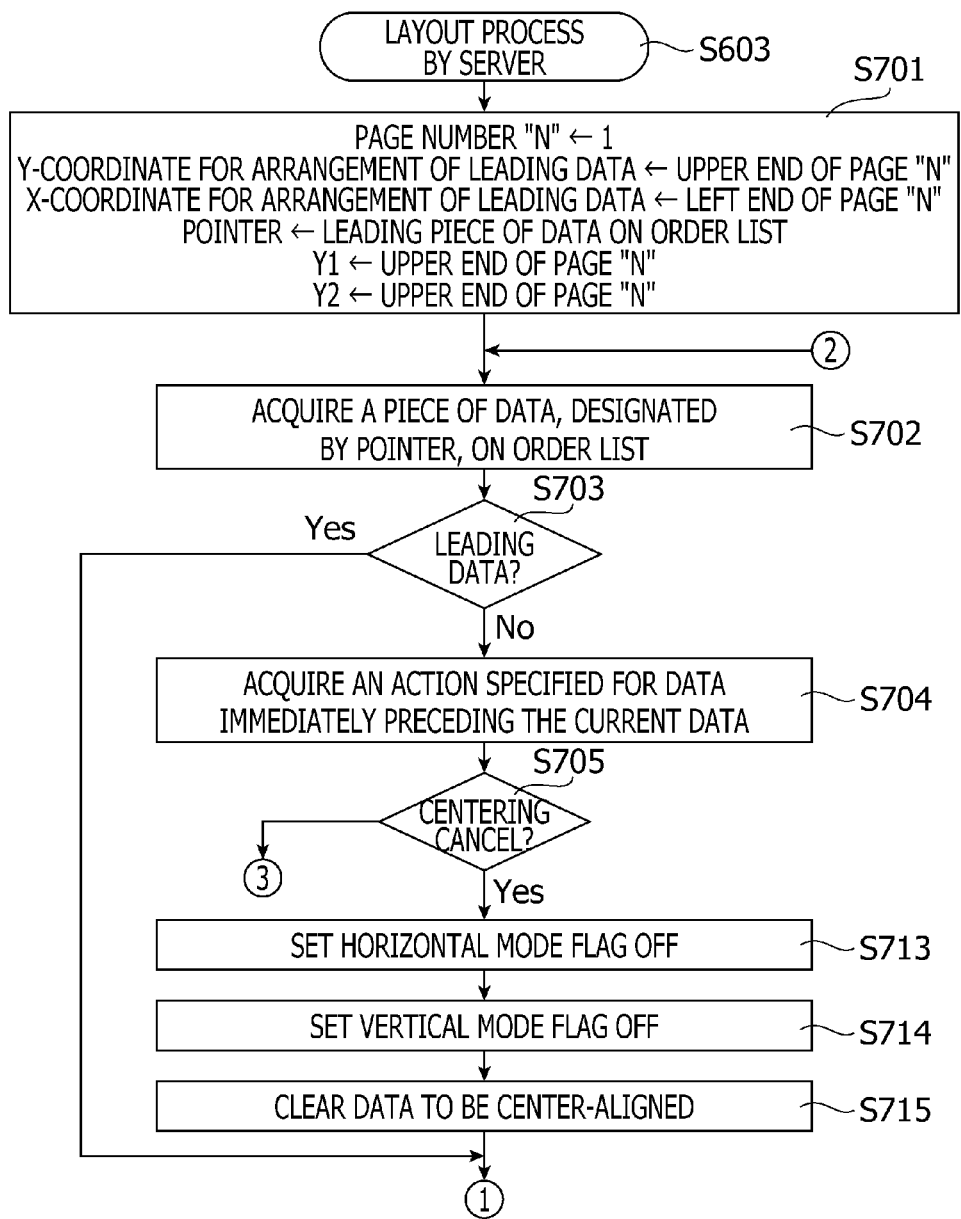
FIGS. 7A to 7F are flowcharts showing a specific procedure of a layout process in the image processing shown in FIG. 6A in the illustrative embodiment according to one or more aspects of the present disclosure.
Figure 7B:
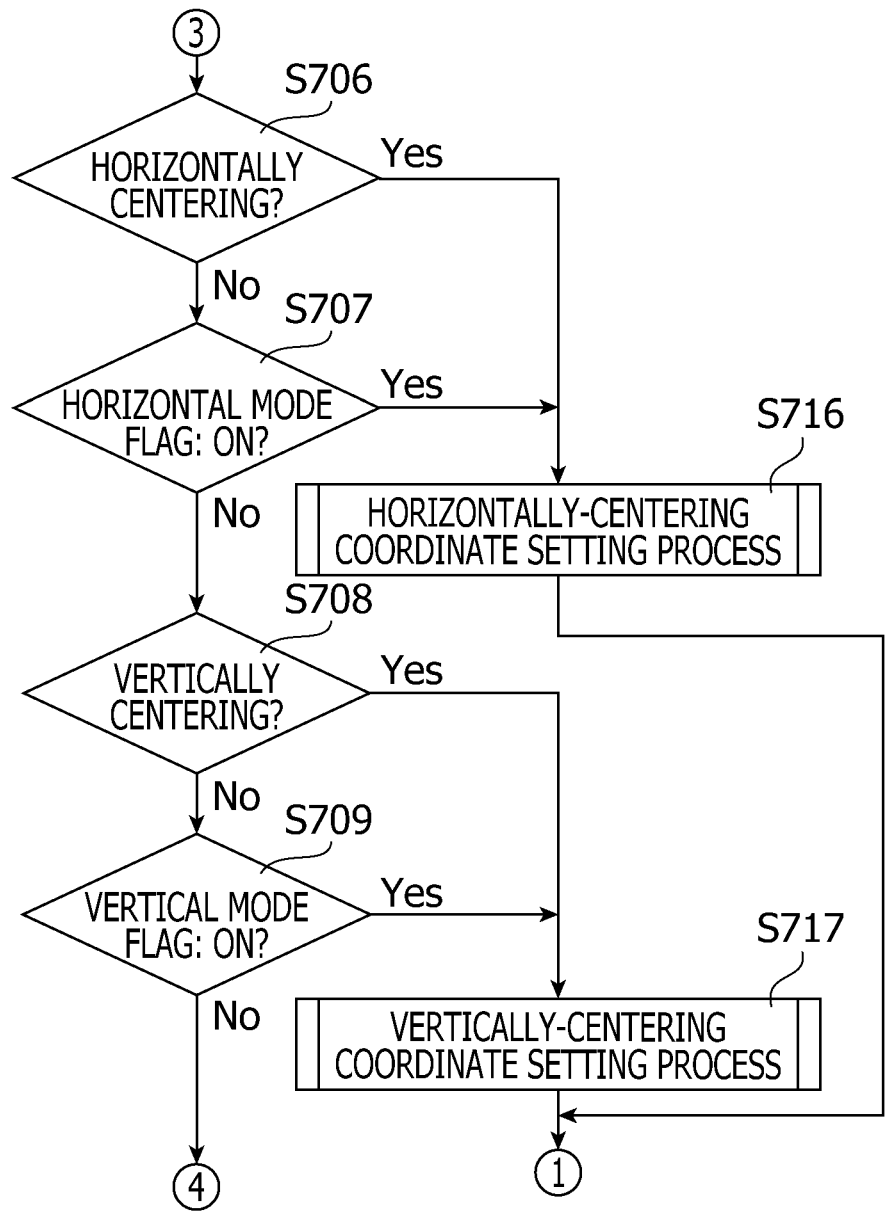
Figure 7C:
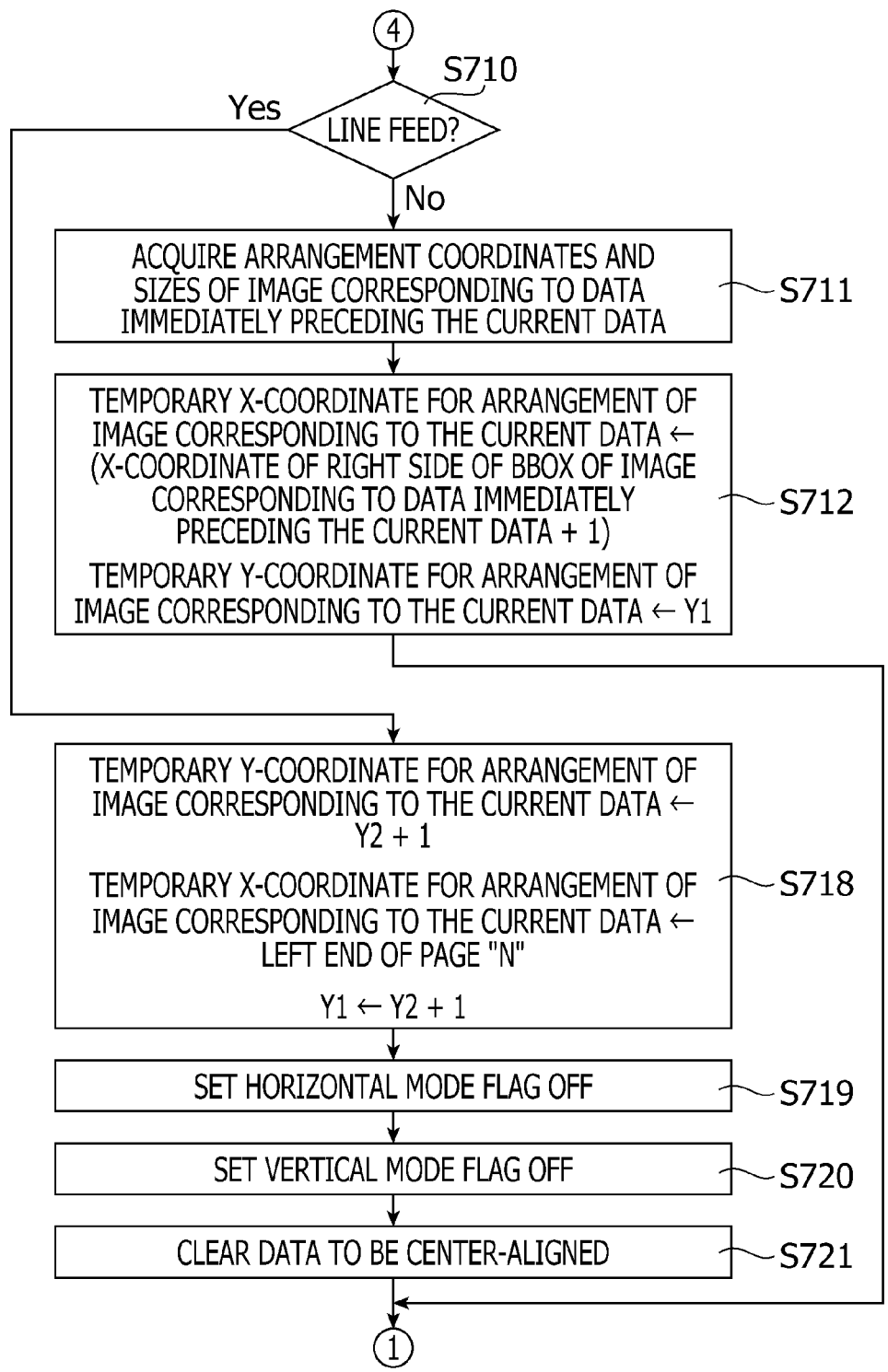
Figure 7D:
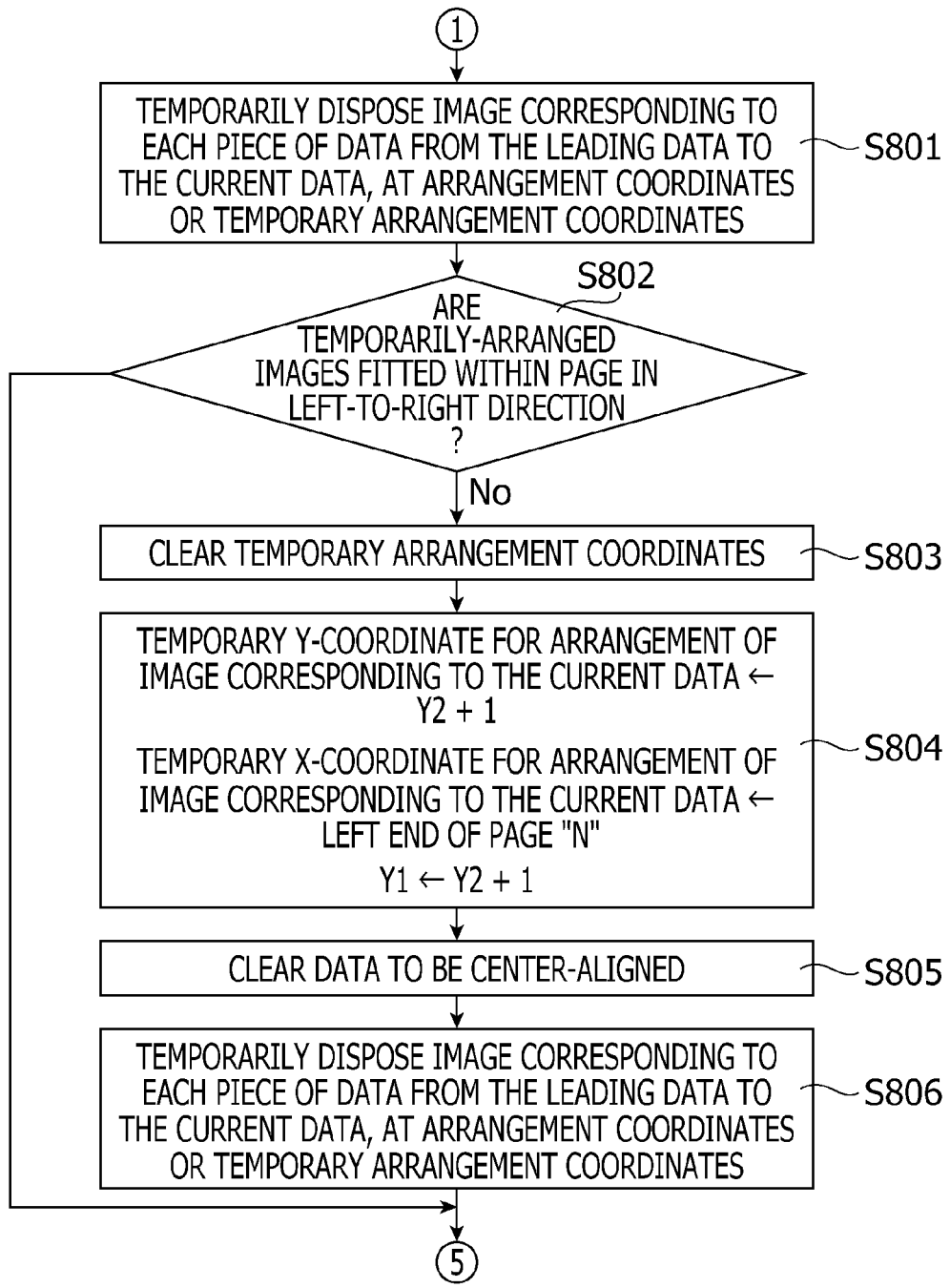
Figure 7E:
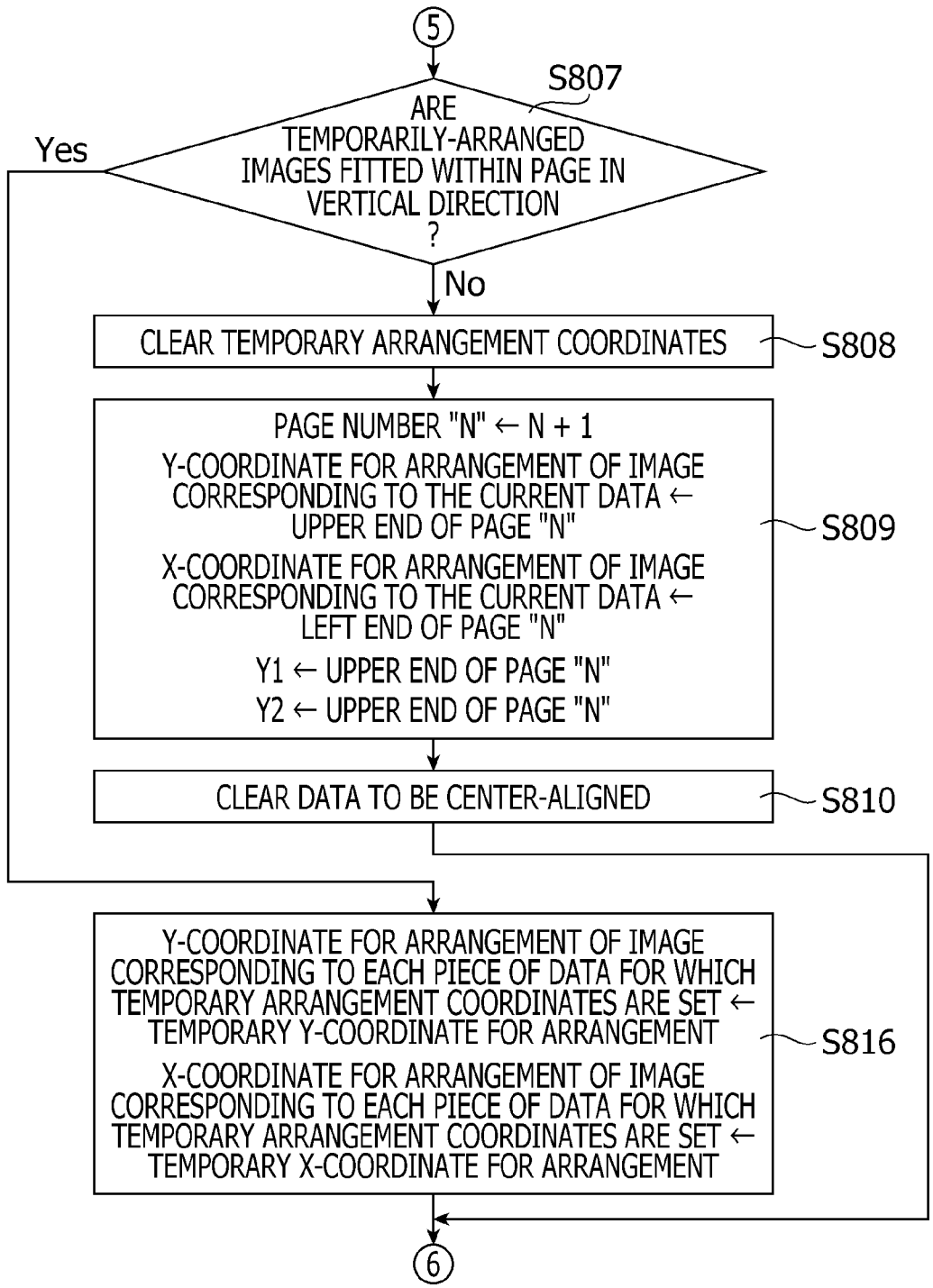
Figure 7F:
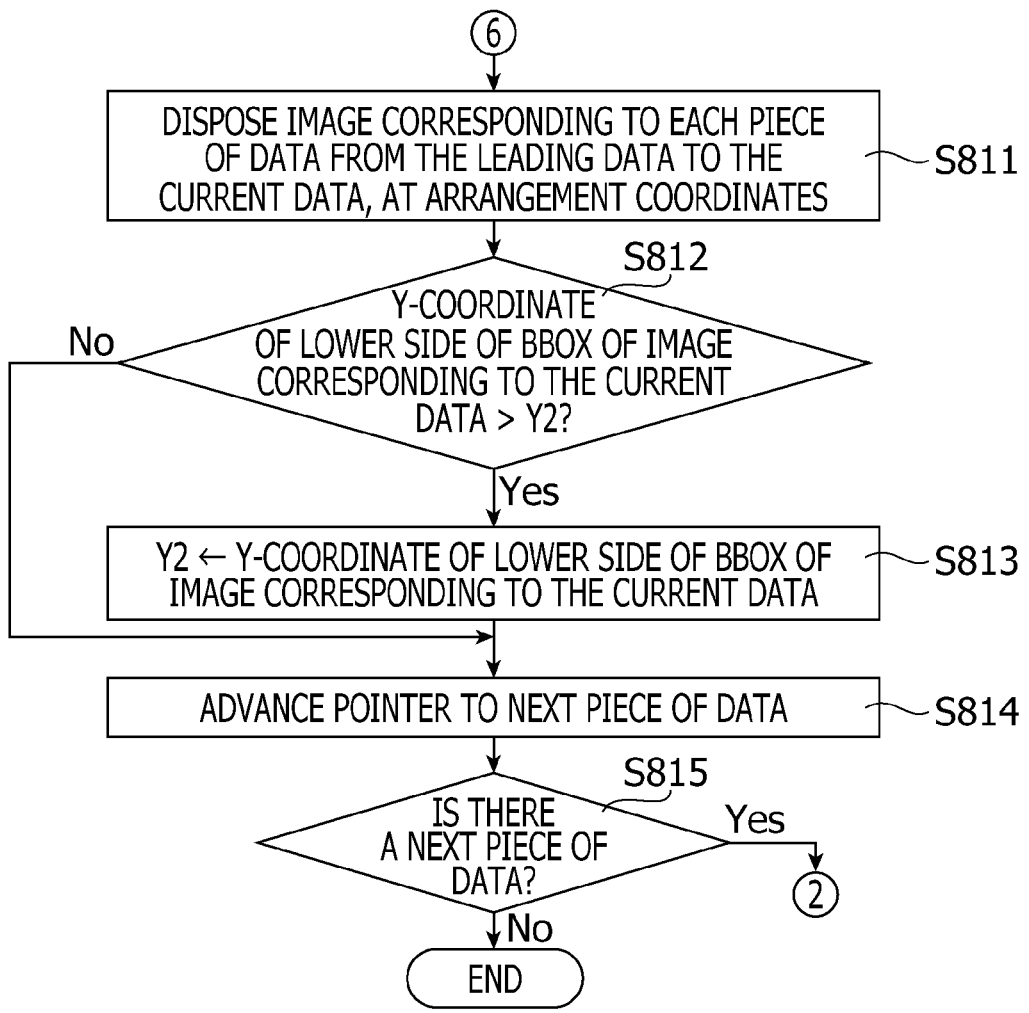

FIG. 6C is a flowchart showing a specific procedure of the aforementioned arrangement order determining process (S602). The CPU 11 creates, in the RAM 13, a list with orders specified and a list without orders specified, and initialized the lists (S641). The CPU 11 sets a pointer to be directed to a leading piece (a first piece) of data on the image list created in S601 (S642). The CPU 11 acquires the piece of data designated by the pointer, from the data on the image list (S643). The CPU 11 determines whether there is an order specifying number 51 for the acquired piece of data (more specifically, whether there is stored a value more than zero as an order specifying number 51 for the acquired piece of data) (S644).

When determining that there is an order specifying number 51 for the acquired piece of data (S644: Yes), the CPU 11 adds the acquired piece of data (the target data to be processed) onto the list with orders specified, such that registered pieces of data are listed in ascending sequence of their order specifying numbers 51 (S645). When determining that there is not an order specifying number 51 for the acquired piece of data (S644: No), the CPU 11 adds the acquired piece of data (the target data to be processed) onto the list without orders specified, such that registered pieces of data are listed in ascending order of the y-coordinates, acquired in S624, of the BBOXes 71 (S649). It is noted that, when determining that there are on the list without orders specified, one or more pieces of data that have the same y-coordinate of the BBOXes 71 as the target data to be processed, the CPU 11 adds the target data to be processed onto the list without orders specified, such that the pieces of data with the same y-coordinate of the BBOXes 71 are listed in ascending order of the x-coordinates of the BBOXes 71.

After S645 or S649, the CPU 11 advances the pointer to a next piece of data on the image list (S646). When determining that there is a next piece of data on the image list (S647: Yes), the CPU 11 goes back to S643. Meanwhile, when determining that there is not a next piece of data on the image list (i.e., when all pieces of data on the image list have been processed) (S647: No), the CPU 11 creates an order list by connecting the list without orders specified (created in S649) to a bottom of the list with orders specified (created in S645) (S648). Then, the CPU 11 terminates the arrangement order determining process.

According to the order list created in S648, the frames 51 in which the order specifying numbers 61 are written are preferentially arranged earlier than the frames 51 in which the order specifying numbers 61 are not written. Further, the frames 51 in which the order specifying numbers 61 are written are arranged in ascending order of the order specifying numbers 61. Meanwhile, the frames 51 in which the order specifying numbers 61 are written are arranged in ascending order of the y-coordinates of the BBOXes 71.

FIGS. 7A to 7F are flowcharts showing a specific procedure of the aforementioned layout process (S603). The CPU 11 sets each parameter to an initial value (S701). Specifically, the CPU 11 assigns "1" to a variable N for identifying a page number of the page Pa, and sets a y-coordinate for arrangement and an x-coordinate for arrangement of a leading piece (a first piece) of data to the upper end and the left end of the page Pa, respectively. Further, the CPU 11 sets the pointer to be directed to the leading piece of data on the order list created in S602. Further, the CPU 11 sets a variable Y1 and a variable Y2 to the y-coordinate of the upper end on the Pa identified by the variable N. It is noted that the variable Y1 represents a y-coordinate of an upper end of a line in which a target image is disposed. Further, the variable Y2 represents a y-coordinate of a lower end of the line in which the target image is disposed.

The CPU 11 acquires a piece of data, designated by the pointer, on the order list (S702). It is noted that, hereinafter, the data designated by the pointer may be referred to as the "current data." When determining that the current data is the leading piece of data on the order list (S703: Yes), the CPU 11 goes to S801. Meanwhile, when determining that the current data is a piece of data other than the leading data on the order list (i.e., the current data is the second piece or one of subsequent pieces of data on the order list) (S703: No), the CPU 11 acquires, from the image list, an action specified by an action specifying symbol 62 of a piece of data immediately preceding the current data (S704).

When determining that the acquired action is an action corresponding to the centering cancel symbol 62c (S705: Yes), the CPU 11 sets OFF a horizontal mode flag and a vertical mode flag provided in the RAM 13 (S713 and S714). The horizontal mode flag is a flag that indicates whether the automatic horizontally-centering alignment based on the automatic centering mode set ON is in execution. When the horizontal mode flag is set ON, the automatic horizontally-centering alignment based on the automatic centering mode set ON is in execution. Meanwhile, the vertical mode flag is a flag that indicates whether the automatic vertically-centering alignment based on the automatic centering mode set ON is in execution. When the vertical mode flag is set ON, the automatic vertically-centering alignment based on the automatic centering mode set ON is in execution.

Thus, according to the operations in S705, S713, and S714, when the acquired action is an action corresponding to the centering cancel symbol 62c, both the horizontal mode flag and the vertical mode flag are set OFF. Therefore, the automatic horizontally-centering alignment or the automatic vertically-centering alignment in execution is considered to be terminated after final execution of the alignment for an image corresponding to the data immediately preceding the current data. Next, the CPU 11 clears data to be center-aligned stored in the RAM 13 (S715). Then, the CPU 11 goes to S801. It is noted that the data to be center-aligned specifies images to be successively aligned in a row along the vertical direction or the left-to-right direction when the horizontally-centering alignment or the vertically-centering alignment is executed, regardless of whether the alignment is automatically executed.

When determining that the acquired action is an action corresponding to the horizontally-centering symbol 62a (S705: No, and S706: Yes), the CPU 11 performs a horizontally-centering coordinate setting process to set coordinates of the image corresponding to the current data to be disposed in the horizontally-centering manner (S716). Thereafter, the CPU 11 goes to S801. The horizontally-centering coordinate setting process (S716) will be described later in detail with reference to FIGS. 8A to 8B. Even though the acquired action is not an action corresponding to the horizontally-centering symbol 62a, when the horizontal mode flag is set ON (S706: No, and S707: Yes), the automatic horizontally-centering alignment is in execution, and therefore, the CPU 11 performs the horizontally-centering coordinate setting process (S716).

When determining that the acquired action is an action corresponding to the vertically-centering symbol 62b (S707: No, and S708: Yes), the CPU 11 performs a vertically-centering coordinate setting process to set coordinates of the image corresponding to the current data to be disposed in the vertically-centering manner (S717). Thereafter, the CPU 11 goes to S801. The vertically-centering coordinate setting process (S717) will be described later in detail with reference to FIGS. 9A to 9B. Even though the acquired action is not an action corresponding to the vertically-centering symbol 62b, when the vertical mode flag is set ON (S708: No, and S709: Yes), the automatic vertically-centering alignment is in execution, and therefore, the CPU 11 performs the vertically-centering coordinate setting process (S717).

When determining that the acquired action is an action corresponding to the line feed symbol 62d (S709: No, and S710: Yes), the CPU 11 performs a process to dispose the image corresponding to the current data in a next new line (S718). Specifically, the CPU 11 sets "Y2+1" as a temporary y-coordinate for arrangement of the current data. Further, the CPU 11 sets a coordinate of the left end on the page Pa identified by the variable N as a temporary x-coordinate for arrangement of the current data. Furthermore, the CPU assigns "Y2+1" to the variable Y1. After S718, the CPU 11 sets OFF the horizontal mode flag and the vertical mode flag (S719 and S720). Then, the CPU 11 clears the data to be center-aligned (S721). After that, the CPU 11 goes to S801.

Meanwhile, when determining that the acquired action is not an action corresponding to the line feed symbol 62*d*, i.e., when there is not an action corresponding to the data immediately preceding the current data (S710: No), the CPU 11 acquires arrangement coordinates set for the image corresponding to the data immediately preceding the current data, and sizes of the image in the x-axis direction and the y-axis direction (S711). It is noted that "arrangement coordinates" is a collective term for a y-coordinate for arrangement and an x-coordinate for arrangement.

The CPU 11 performs a process to normally dispose the image corresponding to the current data (S712). Thereafter, the CPU 11 goes to S801. Specifically, in S712, the CPU 11 sets a value resulting from adding one to an x-coordinate of a right side of a BBOX 71 of the image corresponding to the data immediately preceding the current data, as the temporary x-coordinate for arrangement of the current data. It is noted that the CPU 11 determines (calculates) the x-coordinate of the right side of the BBOX 71 of the image corresponding to the data immediately preceding the current data, based on arrangement coordinates and sizes (acquired in S711) that is set for the image corresponding to the data immediately preceding the current data. Further, in S712, the CPU 11 assigns "Y1" to the temporary y-coordinate for arrangement of the current data.

In S801 (see FIG. 7D), the CPU 11 temporarily disposes an image corresponding to each individual piece of data from the leading data to the current data, at the arrangement coordinates or temporary arrangement coordinates set for the corresponding image. It is noted that "temporary arrangement coordinates" is a collective term for a temporary y-coordinate for arrangement and a temporary x-coordinate for arrangement. Specifically, in S801, the CPU 11 arranges images for which temporary arrangement coordinates are set, in accordance with the temporary arrangement coordinates, and arranges images for which temporary arrangement coordinates are not set, in accordance with arrangement coordinates set therefor.

The CPU 11 determines whether the images temporarily arranged in S801 are fitted within the page Pa in the left-to-right direction (S802). When determining that the images temporarily arranged in S801 are not fitted within the page Pa in the left-to-right direction (S802: No), the CPU 11 clears the temporary arrangement coordinates as set (S803). Next, the CPU performs the same process as S718 to dispose the image corresponding to the current data in a next new line (S804).

After S804, the CPU 11 clears the data to be center-aligned (S805). The CPU 11 temporarily disposes an image corresponding to each individual piece of data from the leading data to the current data, at the arrangement coordinates or the temporary arrangement coordinates set for the corresponding image (S806). Thereafter, the CPU 11 goes to S807. As a result of S806, the image corresponding to the current data is disposed at the temporary arrangement coordinates set in S804. Further, each of the images corresponding to the other pieces of data is disposed at the arrangement coordinates finally set for an image corresponding to each individual piece of data from the leading data to the data immediately preceding the current data.

Meanwhile, in S802, when determining that the images temporarily arranged in S801 are fitted within the page Pa in the left-to-right direction (S802: Yes), the CPU 11 goes to S807. In S807, the CPU 11 determines whether the images temporarily arranged in S801 or S806 are fitted within the page Pa in the vertical direction. When determining that the images temporarily arranged in S801 or S806 are not fitted within the page Pa in the vertical direction (S807: No), the CPU 11 clears the temporary arrangement coordinates as set (S808).

Subsequently, the CPU 11 performs a process to dispose the image corresponding to the current data on a next new page Pa (S809). Specifically, the CPU 11 increments the variable N, which identifies the page number of the page Pa, by one, and sets the y-coordinate for arrangement and the x-coordinate for arrangement of the current data to the upper end and the left end of the page Pa identified by the variable N, respectively. Further, the CPU 11 sets the variable Y1 and the variable Y2 to the upper end of the page Pa identified by the variable N. After S809, the CPU 11 clears the data to be center-aligned (S810).

Meanwhile, when determining that the images temporarily arranged in S801 or S806 are fitted within the page Pa in the vertical direction (S807: Yes), the CPU 11 sets arrangement coordinates of the image corresponding to each individual piece of data for which temporary arrangement coordinates are set, to the temporary arrangement coordinates currently set for the corresponding image (S816). As results of S816 and S809, final arrangement coordinates are set for the image corresponding to each individual piece of data from the leading data to the current data. It is noted that, even though the temporarily-arranged images are not fitted within the page Pa in the left-to-right direction or the vertical direction, the states of the horizontal mode flag and the vertical mode flag are not changed. Therefore, in this case, the automatic horizontally-centering alignment and the automatic vertically-centering alignment are as well applied to images subsequent to the image corresponding to the current data in a next new line or on a next new page.

After S810 and S816, the CPU 11 disposes the image corresponding to each individual piece of data from the leading data to the current data, at the arrangement coordinates set for the corresponding image (S811). As described above, according to the steps S802 to S810, and S816, when the image corresponding to the current data is placed in a position according to the action specifying symbol 62, if the image is not allowed to be fitted within the page in the left-to-right direction or the vertical direction, a next new line or a next new page is automatically started. Thus, it is possible to certainly fit each image within a corresponding page Pa.

Next, when determining that the y-coordinate of the lower side of the BBOX 71 of the image corresponding to the current data is more than the current value of the variable Y2 (S812: Yes), the CPU 11 assigns, to the variable Y2, the y-coordinate of the lower side of the BBOX 71 of the image corresponding to the current data (S813). The CPU 11 goes to S814. Meanwhile, when determining that the y-coordinate of the lower side of the BBOX 71 of the image corresponding to the current data is equal to or less than the current value of the variable Y2 (S812: No), the CPU 11 goes to S814.

In S814, the CPU 11 advances the pointer to a next piece of data on the order list (S814). When determining that there is a next piece of data on the order list (S815: Yes), the CPU 11 goes to S702 (see FIG. 7A). Meanwhile, when determining that there is not a next piece of data on the order list, i.e., that all pieces of data on the order list have been processed (S815: No), the CPU 11 terminates the layout process.

Figure 8A:
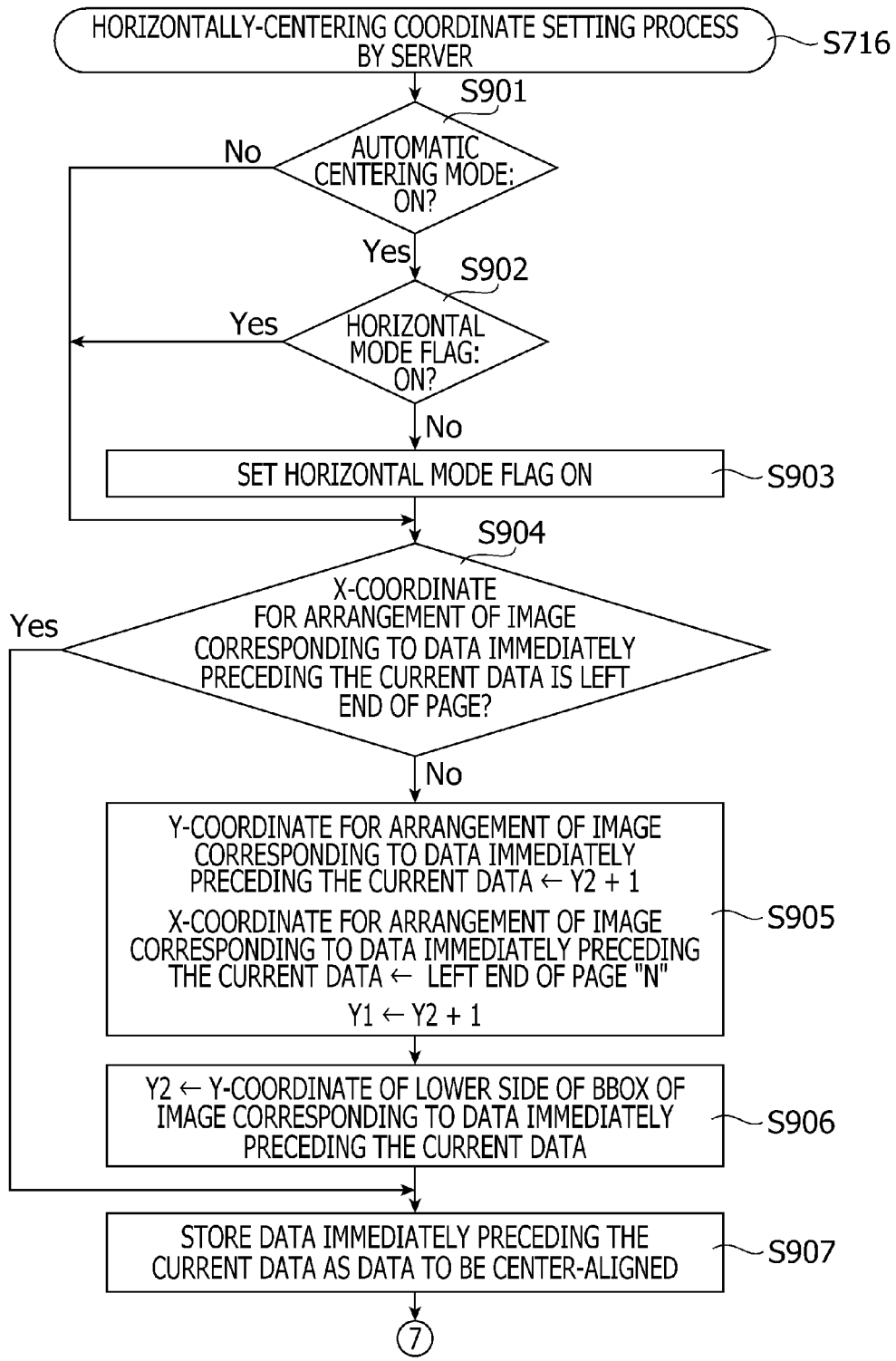
FIGS. 8A to 8B are flowcharts showing a specific procedure of a horizontally-centering coordinate setting process in the layout process shown in FIGS. 7A to 7F in the illustrative embodiment according to one or more aspects of the present disclosure.
Figure 8B:
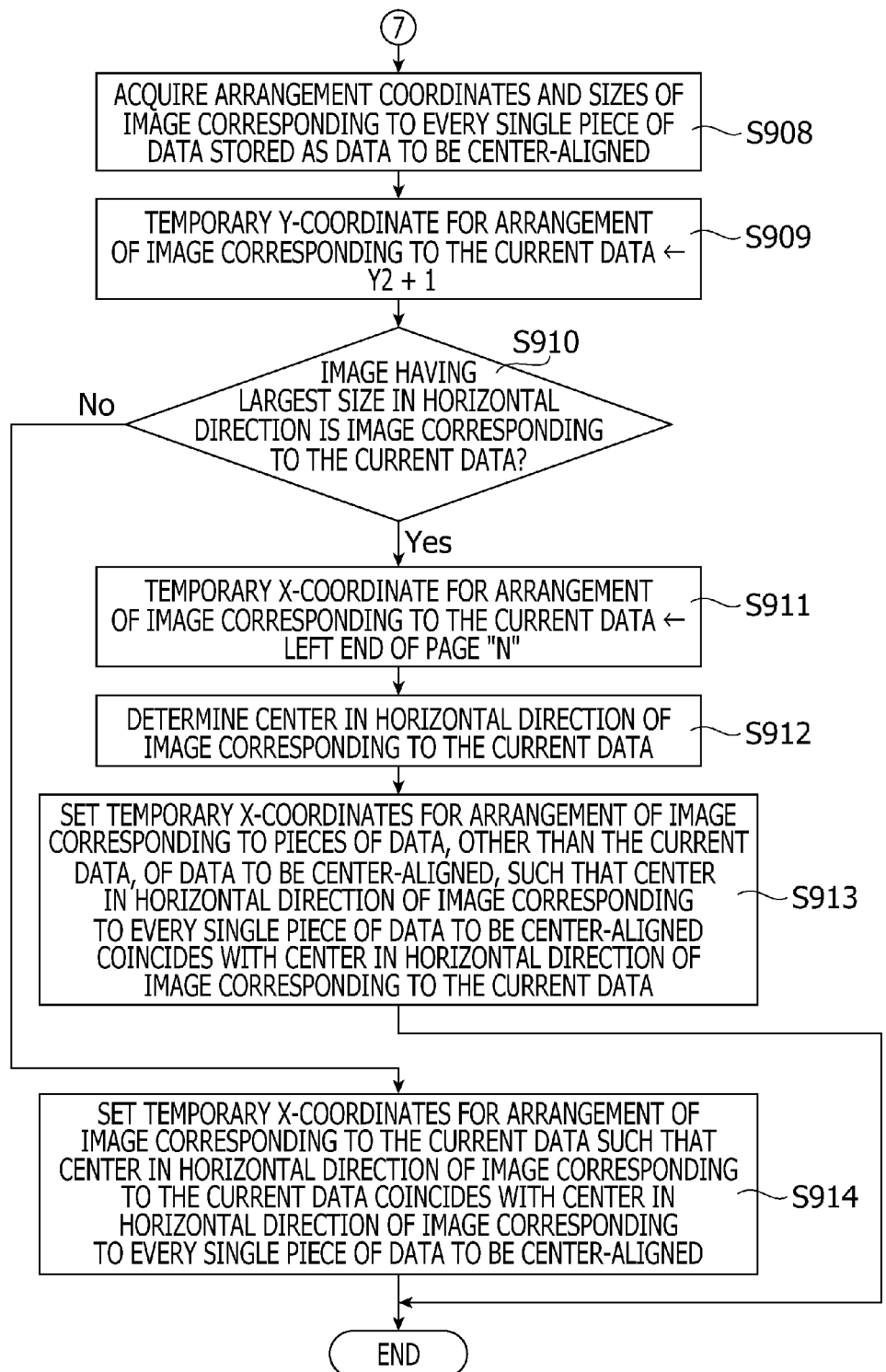

FIGS. 8A to 8B are flowcharts showing a specific procedure of the aforementioned horizontally-centering coordinate setting process (S716). The CPU 11 determines whether the automatic centering mode is set ON (S901). It is noted that, in the illustrative embodiment, when the server 10 receives, from a sending source device of read image data to be processed, a request (instruction) for use of the automatic centering mode prior to receipt of the read image data, the automatic centering mode is set ON. Then, the automatic centering mode set ON is set OFF in response to completion of a series of operations of the image processing shown in FIG. 6A. When the server 10 does not receive a request (instruction) for use of the automatic centering mode, the automatic centering mode remains OFF.

When determining that the automatic centering mode is set ON, and that the horizontal mode flag provided in the RAM 13 is set OFF (S901: Yes, and S902: No), the CPU 11 sets the horizontal mode flag ON (S903). Thereafter, the CPU 11 goes to S904. Meanwhile, when determining that the horizontal mode flag provided in the RAM 13 is set ON (S902: Yes), the CPU 11 goes to S904 without executing S903. Further, when determining that the automatic centering mode is set OFF (S901: No), the CPU 11 goes to S904.

In S904, the CPU 11 determines whether the x-coordinate for arrangement of the data immediately preceding the current data is the left end of the page Pa. When determining that the x-coordinate for arrangement of the data immediately preceding the current data is not the left end of the page Pa (S904: No), the CPU 11 performs a process to place the image corresponding to the data immediately preceding the current data in a next new line (S905). Specifically, the CPU 11 assigns "Y2+1" to the y-coordinate for arrangement of the data immediately preceding the current data. The CPU 11 assigns a coordinate of the left end of the page Pa identified by the variable N to the x-coordinate for arrangement of the data immediately preceding the current data. Further, the CPU 11 assigns "Y2+1" to the variable Y1. Subsequently, the CPU 11 assigns, to the variable Y2, the y-coordinate of the lower side of the BBOX 71 of the image corresponding to the data immediately preceding the current data when the image corresponding to the data immediately preceding the current data is disposed at the arrangement coordinates set in S905 (S906). Thereafter, the CPU 11 goes to S907.

Meanwhile, when determining that the x-coordinate for arrangement of the data immediately preceding the current data is the left end of the page Pa (S904: Yes), the CPU 11 goes to S907 without executing S905 or S906. In S907, the CPU 11 stores the data immediately preceding the current data as data to be center-aligned. Next, the CPU 11 acquires arrangement coordinates set for an image corresponding to every single piece of data stored as data to be center-aligned, and sizes in the x-axis direction and the y-axis direction of the image corresponding to every single piece of data stored as data to be center-aligned (S908).

The CPU 11 assigns "Y2+1" to the temporary y-coordinate for arrangement of the current data (S909). Next, the CPU 11 determines whether an image having the largest size in the horizontal direction, among the images corresponding to all pieces of data to be center-aligned, is the image corresponding to the current data (S910). It is noted that the "horizontal direction" is the left-to-right direction of the page Pa. When determining that an image having the largest size in the horizontal direction, among the images corresponding to all pieces of data to be center-aligned, is the image corresponding to the current data (S910: Yes), the CPU 11 sets the temporary x-coordinate for arrangement of the current data to the coordinate of the left end of the page Pa identified by the variable N (S911). Subsequently, the CPU 11 determines (calculates) an x-coordinate of a center in the horizontal direction (the left-to-right direction) of the image corresponding to the current data when the image corresponding to the current data is placed at the temporary arrangement coordinates set in S909 and S911 (S912).

The CPU 11 determines (calculates) and sets temporary x-coordinates for arrangement of images corresponding to pieces of data, other than the current data, of the data to be center-aligned, such that a center in the horizontal direction of the image corresponding to every single piece of data to be center-aligned coincides with the x-coordinate (determined in S912) of the center in the horizontal direction of the image corresponding to the current data (S913). Meanwhile, when determining that an image having the largest size in the horizontal direction, among the images corresponding to all the pieces of data to be center-aligned, is not the image corresponding to the current data (S910: No), the CPU 11 determines (calculates) and sets a temporary x-coordinate for arrangement of the image corresponding to the current data such that the center in the horizontal direction of the image corresponding to the current data positionally coincides with the center in the horizontal direction of the image corresponding to every single piece of data to be center-aligned (S914).

After S913 or S914, the CPU 11 terminates the horizontally-centering coordinate setting process. According to the operations in S910 to S914, even though the images corresponding to all the pieces of data to be center-aligned have different sizes in the horizontal direction (i.e., the left-to-right direction), respectively, it is possible to arrange the images in the horizontally-centering manner so as to prevent any of the images from protruding out of the left end of the page Pa.

Figure 9A:
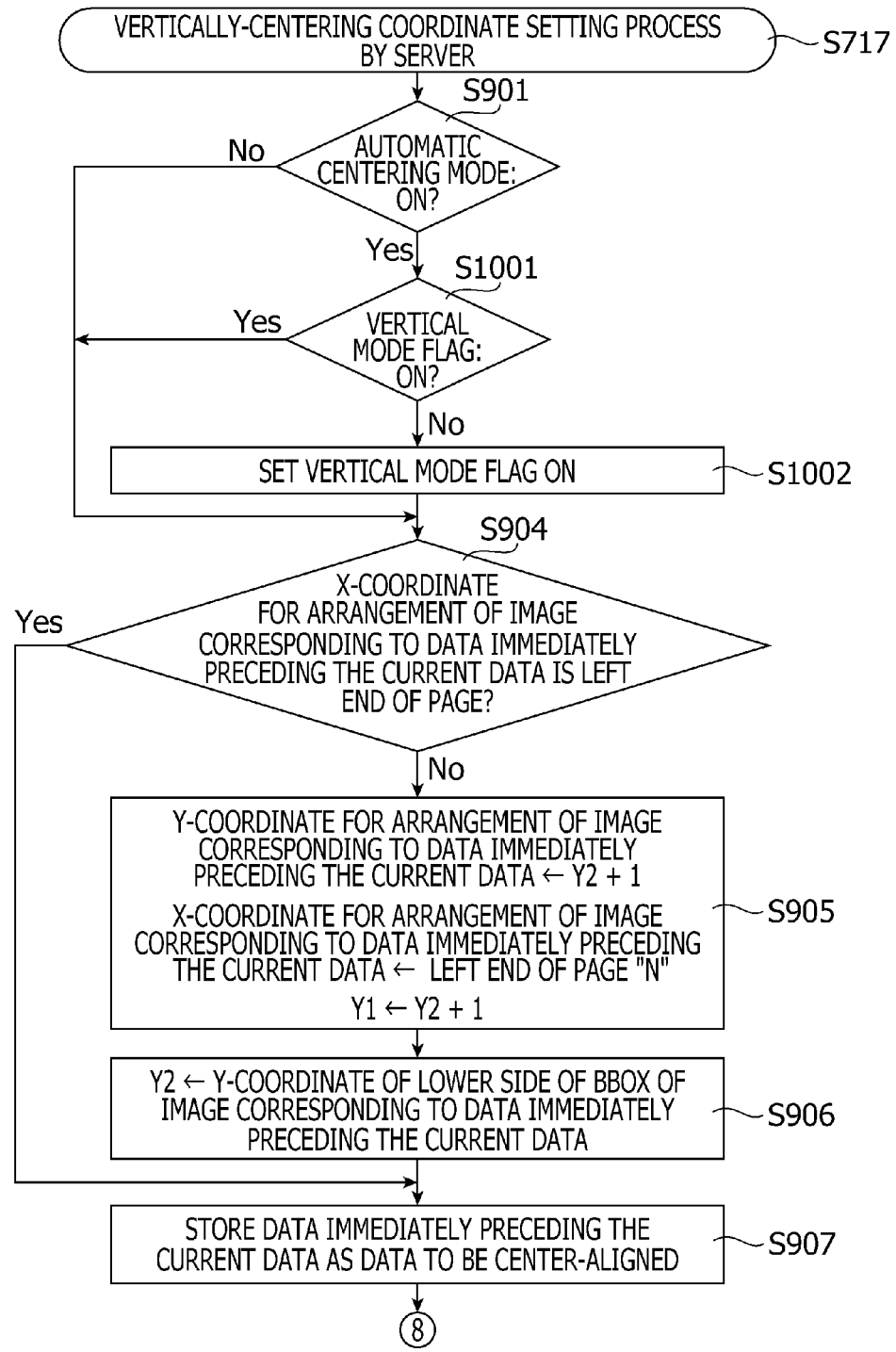
FIGS. 9A to 9B are flowcharts showing a specific procedure of a vertically-centering coordinate setting process in the layout process shown in FIGS. 7A to 7F in the illustrative embodiment according to one or more aspects of the present disclosure.
Figure 9B:
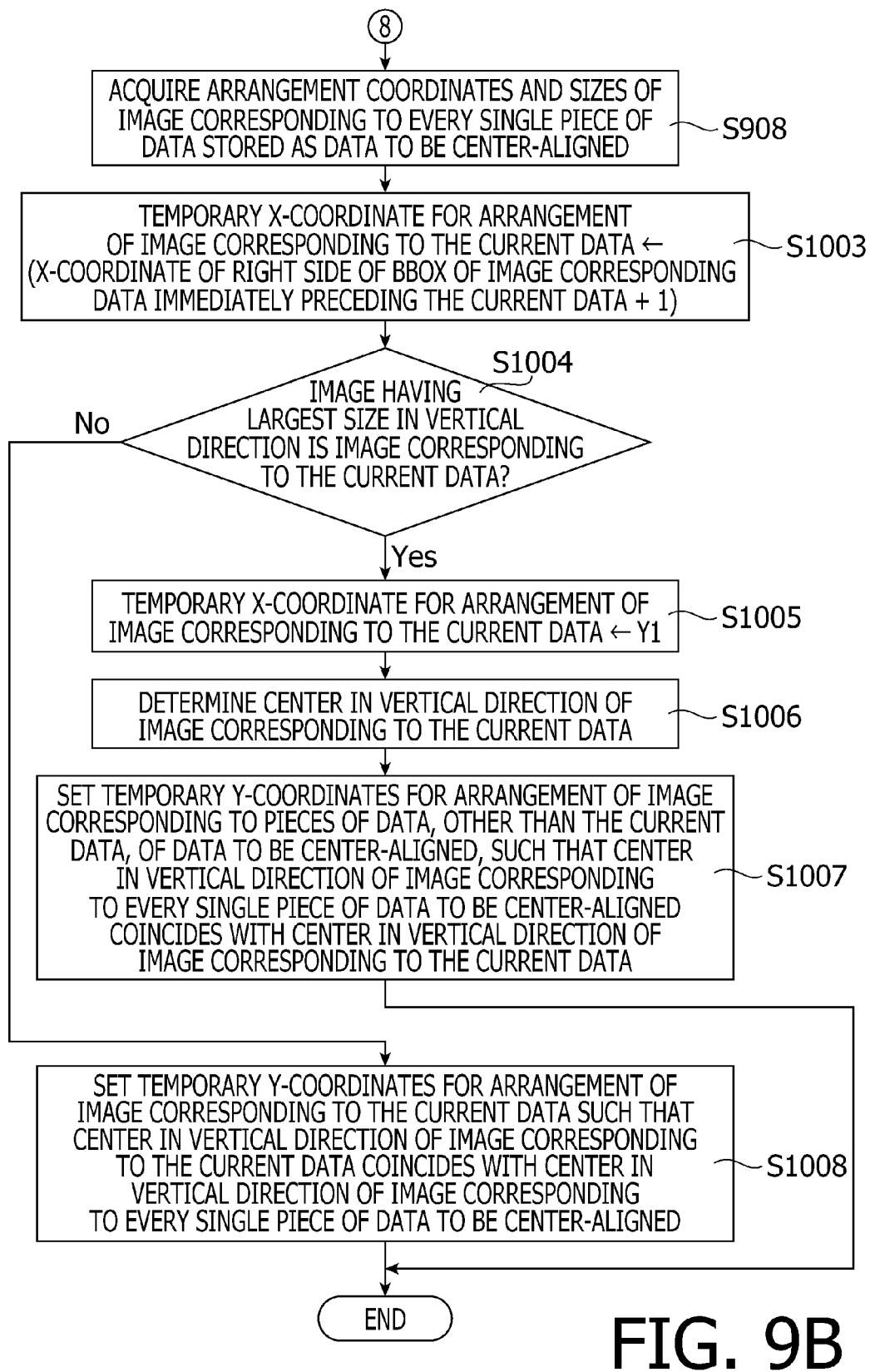

FIGS. 9A to 9B are flowcharts showing a specific procedure of the aforementioned vertically-centering coordinate setting process (S717). In the vertically-centering coordinate setting process (S717), substantially the same operations as those of the horizontally-centering coordinate setting process (S716) will be provided with the same step numbers, and explanations about the same operations may be omitted. When determining that the automatic centering mode is set ON, and that the vertical mode flag provided in the RAM 13 is set OFF (S901: Yes, and S1001: No), the CPU 11 sets the vertical mode flag ON (S1002). Thereafter, the CPU 11 goes to S904. Meanwhile, when determining that the vertical mode flag provided in the RAM 13 is set ON (S1001: Yes), the CPU 11 goes to S904 without executing S1002.

After executing S904 to S908 in the same manner as the horizontally-centering coordinate setting process (S716), the CPU 11 assigns a value resulting from incrementing, by one, the x-coordinate of the right side of the BBOX 71 of the image corresponding to the data immediately preceding the current data, to the temporary x-coordinate for arrangement of the current data (S1003). Next, the CPU 11 determines whether the image corresponding to the current data is an image having the largest size in the vertical direction (i.e., an upside-to-downside direction on the page Pa) among the images corresponding to all the pieces of data to be center-aligned (S1004). When determining that the image corresponding to the current data is an image having the largest size in the vertical direction among the images corresponding to all the pieces of data to be center-aligned (S1004: Yes), the CPU 11 assigns Y1 to the temporary y-coordinate for arrangement of the current data. Subsequently, the CPU 11 determines (calculates) a y-coordinate of the center in the vertical direction of the image corresponding to the current data when the image corresponding to the current data is placed at the temporary arrangement coordinates (i.e., the temporary x-coordinate for arrangement and the temporary y-coordinate for arrangement) set in S1003 and S1005 (S1006).

The CPU 11 determines (calculates) and sets temporary y-coordinates for arrangement of images corresponding to pieces of data, other than the current data, of the data to be center-aligned, such that a center in the vertical direction of the image corresponding to every single piece of data to be center-aligned coincides with the y-coordinate (determined in S1006) of the center in the vertical direction of the image corresponding to the current data (S1007). Meanwhile, when determining that an image having the largest size in the vertical direction, among the images corresponding to all the pieces of data to be center-aligned, is not the image corresponding to the current data (S1004: No), the CPU 11 determines (calculates) and sets a temporary y-coordinate for arrangement of the image corresponding to the current data such that the center in the horizontal direction of the image corresponding to the current data positionally coincides with the center in the vertical direction of the image corresponding to every single piece of data to be center-aligned (S1008).

After S1007 and S1008, the CPU 11 terminates the process shown in FIGS. 9A to 9B. According to the operations in S1004 to S1008, even though the images corresponding to all the pieces of data to be center-aligned have different sizes in the vertical direction, respectively, it is possible to arrange the images in a single line in the left-to-right direction in the vertically-centering manner so as to prevent any of the images from overlapping images in a previous line.

In the aforementioned illustrative embodiment, when the user forms a plurality of frames 51 on a document sheet P in a hand-writing manner, the user is allowed to easily generate image data in which images corresponding to the plurality of frames 51 are arranged in accordance with a user-desired layout by writing action specifying symbols 62 according to the user-desired layout, as needed, onto images within frames 51. Further, in the automatic centering mode, based on a single horizontally-centering symbol 62a or a single vertically-centering symbol 62b written on an image, it is possible to automatically arrange subsequent images in a centering manner (the horizontally-centering manner or the vertically-centering manner). Thus, it is possible to simplify an operational procedure for applying centering alignment to the images.

Further, it is possible to determine the arrangement orders of the images to be arranged as user desires, depending on whether to write order specifying numbers 61 in the frames 51 for the images, and what numbers are written as the order specifying numbers 61. Thus, in this respect, it is possible to easily generate image data in which the images corresponding to the plurality of frames 51 are arranged in accordance with the user-desired layout.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modification>

In the aforementioned illustrative embodiment, the devices such as the MFP 30 and the image scanners 40 configured to read document sheets, and the server 10 configured to process read image data are different separate devices. Nonetheless, a single device, which has a scanning function, may be configured to process image data read by the device itself, in the same manner as the server 10. For example, the MFP 30 may have a program stored therein that corresponds to the image processing application 14a, and may be configured to process image data read by the MFP 30 itself with the scanning function thereof, in accordance with the flowcharts shown in FIGS. 6A to 10. Further, in the aforementioned illustrative embodiment, the PCs 100 are exemplified as devices capable of transmitting the read image data to the server 10. Nonetheless, mobile terminal devices such as tablet PCs and smartphones may be employed as devices capable of transmitting the read image data to the server 10.

In the aforementioned illustrative embodiment, numeric characters as the order specifying numbers 61 are exemplified as symbols for specifying orders. Nonetheless, for example, orders may previously be defined in association with shapes and colors of figures. In this case, arrangement orders may be determined based on figures written on a document sheet P as symbols for specifying orders. Further, there may be figures encircling numeric characters as the order specifying numbers 61, and the numeric characters may be grouped depending on the figures. In this case, when there are a lot of frames 51, it is not required to write different numbers (as the order specifying numbers 61) in all the frames 51, respectively. Further, it is possible to arrange images in a user-desired order on a group-by-group basis.

In the aforementioned illustrative embodiment, conditions for a written symbol to be treated as the horizontally-centering symbol 62a or the vertically-centering symbol 62b include a condition that the symbol is a circle overlapping a frame 51. Nonetheless, the conditions may not include the condition that the symbol is a circle overlapping a frame 51. For instance, the circle F2 shown in FIG. 5B, which is not treated as the horizontally-centering symbol 62a in the aforementioned illustrative embodiment, may be treated as the horizontally-centering symbol 62a.

In the aforementioned illustrative embodiment, depending on a position of a written circle relative to a frame 51, it is determined whether the circle is treated as the horizontally-centering symbol 62a or the vertically-centering symbol 62b. Nonetheless, depending on a shape of a figure written relative to a frame 51, it may be discriminated whether the figure is treated as the horizontally-centering symbol 62a or the vertically-centering symbol 62b. It is noted that the shapes of the action specifying symbols 62 are not limited to the shapes exemplified above as various action specifying symbols 62 (e.g., the horizontally-centering symbol 62a), but may be any type of shape.

In the aforementioned illustrative embodiment, when the horizontally-centering alignment or the vertically-centering alignment is applied, if a leading image is not at the left end of the page Pa, the leading image is placed at the left end in a next new line. Nonetheless, even though the leading image is not at the left end of the page Pa, the horizontally-centering alignment or the vertically-centering alignment may be applied with the current position of the leading image as a starting point for the alignment.

In the aforementioned illustrative embodiment, as one of conditions to switch the states of the horizontal mode flag and the vertical mode flag from "ON" to "OFF," exemplified is detection of the centering cancel symbol 62c or the line feed symbol 62d. Nevertheless, the conditions to switch the states of the horizontal mode flag and the vertical mode flag from "ON" to "OFF" are not limited to the above-exemplified condition, i.e., detection of the centering cancel symbol 62c or the line feed symbol 62d. For example, during execution of the automatic horizontally-centering alignment or the automatic vertically-centering alignment, when an image is not fitted within the page Pa in the left-to-right direction or the vertical direction, and is placed in a next new line or on a next new page, the states of the horizontal mode flag and the vertical mode flag may be switched from "ON" to "OFF."

In the aforementioned illustrative embodiment, a specific image is placed in accordance with an action specified by an action specifying symbol 62 written on a frame 51 corresponding to an image immediately preceding the specific image in the arrangement order. Nevertheless, a specific image may be placed in accordance with an action specified by an action specifying symbol 62 written on a frame 51 corresponding to the specific image.

A part of the operations shown in FIGS. 6A to 10 may be omitted or changed within the scope of the inventive concept as expressed herein. For instance, in an image processing device that does not have the automatic centering mode, the operations in S901 to S903, S1001, and S1002 may be omitted. Further, in the process (e.g., S718) to place an image in a next new line, the variable Y1 is set to "Y2+1." Nevertheless, the variable Y1 may be set to "Y2+a" (a: a positive integer equal to or more than one). Further, regarding operation groups such as an operation group of S705, and S713 to S715, an operation group of S706, S707, and S716, an operation group of S708, S709, and S717, and an operation group of S710, and S718 to S721, depending on a type of a previously-prepared action specifying symbol 62, at least one operation group of the above operation groups may be omitted, or may be changed to another operation group responsive to another action specifying symbol 62. Alternatively, a further operation group responsive to a different action specifying symbol 62 may be added to the above operation groups. Furthermore, the operation groups, such as the operation group of S705, and S713 to S715, the operation group of S706, S707, and S716, the operation group of S708, S709, and S717, and the operation group of S710, and S718 to S721, may be executed in a different execution order of the operation groups. Namely, the priority orders of actions are not limited to the priority orders exemplified in the aforementioned illustrative embodiment.

In the aforementioned illustrative embodiment, the CPU 11 is configured to execute the steps shown in FIGS. 6A to 10. Nonetheless, a plurality of CPUs may be configured to execute the steps shown in FIGS. 6A to 10 in cooperation with each other. Further, an integrated circuit (such as an application specific integrated circuit) may be configured to execute the steps shown in FIGS. 6A to 10 alone or in cooperation with one or more other integrated circuits. Furthermore, the CPU 11 and one or more integrated circuits may be configured to execute the steps shown in FIGS. 6A to 10 in cooperation with each other. Aspects of the present disclosure may be achieved by combining, as needed, at least two of the features described in the aforementioned illustrative embodiment and modifications.

What is claimed is:
1. An image processing device comprising:
an image information acquirer configured to acquire image information of an image read out of a document sheet; and
a control device configured to:
  detect a plurality of encircling lines written on the document sheet, based on the acquired image information;
  determine an arrangement order of a partial image formed within each of the detected plurality of encircling lines;
  detect one or more first symbols each written on the document sheet and added to a corresponding one of the partial images, the one or more first symbols relating to how to lay out the partial images;
  determine a layout of the partial images based on the determined arrangement orders and the detected one or more first symbols;
  extract, from the acquired image information, a plurality of pieces of image information each of which is image information of the partial image; and
  generate layout image information in which the extracted plurality of pieces of image information are arranged according to the determined layout.

2. The image processing device according to claim 1, wherein the control device is configured to:
  detect one or more second symbols each written on the document sheet and added to a corresponding one of the partial images, each second symbol specifying an arrangement order of the corresponding partial image; and
  determine an arrangement order of each partial image to which one of the detected one or more second symbols is added, based on the detected one or more second symbols.

3. The image processing device according to claim 2, wherein the control device is configured to:
  determine whether each individual partial image has a second symbol added thereto;
  determine an arrangement order of each earlier-arranged partial image, based on the second symbol added to each earlier-arranged partial image, each earlier-arranged partial image being a partial image determined to have a second symbol added thereto;
  determine an arrangement order of each later-arranged partial image, depending on a position of each later-arranged partial image on the read image, each later-arranged partial image being a partial image determined not to have a second symbol added thereto; and
  determine the arrangement order of the partial image, such that the determined arrangement order of each later-arranged partial image is subsequent to the determined arrangement order of each earlier-arranged partial image.

4. The image processing device according to claim 2, wherein the detected one or more second symbols are one or more numbers, and
wherein the control device is configured to determine the arrangement order of each partial image to which one of the detected one or more second symbols is added, in an ascending order of the one or more numbers as the one or more second symbols.

5. The image processing device according to claim 1, wherein the control device is configured to, when the detected one or more first symbols are one or more centering symbols each specifying centering alignment of target partial images to be center-aligned, determine the layout of the partial images such that the target partial images are center-aligned in a predetermined arrangement direction, and wherein the target partial images to be center-aligned comprise:
- a first partial image to which a centering symbol of the one or more centering symbols is added; and
- a second partial image of which an arrangement order is adjacent to an arrangement order of the first partial image.

6. The image processing device according to claim 5,
wherein the predetermined arrangement direction is one of a first direction and a second direction perpendicular to the first direction, and wherein the control device is configured to determine, as the predetermined arrangement direction, one of the first direction and the second direction, the determined arrangement direction depending on a position, in the first partial image, of the centering symbol added to the first partial image.

7. The image processing device according to claim 6,
wherein the control device is configured to center-align the first partial image and the second partial image, under a condition that the centering symbol added to the first partial image is contained only in a specific area of four divisional areas of a minimum rectangle, the minimum rectangle circumscribing a encircling line for the first partial image, the minimum rectangle being divided into the four divisional areas by two diagonal lines of the rectangle, the rectangle having mutually-adjacent sides each of which is along one of the first direction and the second direction, and wherein, under the condition, the second partial image is disposed on a side of a specific side that is a side of the minimum rectangle, of the sides that define the specific area containing the centering symbol added to the first partial image.

8. The image processing device according to claim 7,
wherein the control device is configured to center-align the first partial image and the second partial image, under a further condition that the centering symbol added to the first partial image is contained only in the specific area of the four divisional areas of the minimum rectangle, and that the specific side of the rectangle is positioned downstream relative to an opposite side of the specific side of the rectangle, and wherein, under the further condition, the second partial image, of which the arrangement order is adjacent and subsequent to the arrangement order of the first partial image, is disposed on the side of the specific side that is a side of the rectangle circumscribing the encircling line for the first partial image, of the sides that define the specific area containing the centering symbol added to the first partial image.

9. The image processing device according to claim 7,
wherein the control device is configured to center-align the first partial image and the second partial image, under a further condition that the centering symbol added to the first partial image is positioned on the encircling line for the first partial image, and wherein, under the further condition, the second partial image is disposed on the side of the specific side that is a side of the rectangle circumscribing the encircling line for the first partial image, of the sides that define the specific area containing the centering symbol added to the first partial image.

10. The image processing device according to claim 5,
wherein the control device is configured to determine a layout of all the target partial images other than a specific partial image with reference to the specific partial image that has a largest size in a direction perpendicular to the predetermined arrangement direction among all the target partial images to be center-aligned.

11. The image processing device according to claim 1,
wherein the control device is configured to, when the detected one or more first symbols are one or more centering symbols each specifying centering alignment of target partial images to be center-aligned, determine the layout of the partial images such that the target partial images are sequentially center-aligned in a predetermined arrangement direction until a predetermined condition is satisfied, and wherein the target partial images to be center-aligned comprise:
- a first partial image to which a centering symbol of the one or more centering symbols is added; and
- one or more second partial images of which arrangement orders are subsequent to an arrangement order of the first partial image.

12. The image processing device according to claim 6,
wherein the control device is configured to, when the arrangement orders of the one or more second target images are subsequent to the arrangement order of the first partial image, determine the layout of the partial images, in such a manner as to dispose a beginning one of subsequent partial images that are not fitted within a predetermined rectangular frame defined by sides along the first direction and sides along the second direction, in a position that is on a starting-point side in the first direction and is downstream in the second direction relative to a target partial image of which an arrangement order is immediately preceding to an arrangement order of the beginning subsequent partial image that is not fitted within the predetermined rectangular frame.

13. The image processing device according to claim 1,
wherein the partial images are arranged in a predetermined arrangement direction that is one of a first direction and a second direction perpendicular to the first direction, and wherein the control device is configured to,
when the detected one or more first symbols are one or more line feed symbols,
determine the layout of the partial images, in such a manner as to dispose a specific partial image to which a line feed symbol of the one or more line feed symbols is added, in a position that is on a starting-point side in the first direction and is on a downstream side in the second direction relative to a partial image of which an arrangement order is immediately preceding to an arrangement order of the specific partial image.

14. The image processing device according to claim 1,
wherein the control device comprises:
- a processor coupled with the image information acquirer; and
- a memory storing processor-executable instructions that, when executed by the processor, cause the processor to:
   detect the plurality of encircling lines;
   determine the arrangement order of the partial image formed within each encircling line;
   detect the one or more first symbols;
   determine the layout of the partial images;

extract the plurality of pieces of image information of the partial images; and generate the layout image information.

15. An image processing system comprising:

an image scanner configured to obtain image information of an image on a document sheet; and a control device configured to:

detect a first encircling line on the document sheet based on the obtained image information;

extract, from the obtained image information, first partial image information corresponding to a first partial image formed within the first encircling line;

detect a particular symbol relative to the detected first encircling line;

associate the first partial image information with the first symbol, the first partial image information and the particular symbol being related to the detected first encircling line;

determine a first output coordinate where the first partial image is reproduced on a sheet based on the particular symbol;

generate first output image information including the first partial image information and the particular coordinate; and output the generated first output image information.

16. The image processing system according to claim 15, wherein the control device is further configured to:

determine a first coordinate representing a position of the detected first encircling line; and determine the first output coordinate based on the first coordinate and the particular symbol.

17. The image processing system according to claim 16, wherein the control device is further configured to:

detect a second encircling line on the document sheet based on the obtained image information;

extract, from the obtained image information, second partial image information corresponding to a second partial image formed within the second encircling line;

detect the particular symbol relative to the detected second encircling line;

associate the second partial image information with the particular symbol, the second partial image information and the particular symbol being related to the detected second encircling line;

determine a second coordinate representing a position of the detected second encircling line;

determine a second output coordinate based on the first coordinate, the second coordinate and the particular symbol;

generate second output image information including the second partial image information and the second output coordinate; and output the generated second output image information.

18. The image processing system according to claim 17, wherein the control device is further configured to:

determine whether the particular symbol represents centering alignment; and when the particular symbol represents the centering alignment, determine the first output coordinate based on the first coordinate, the second coordinate and the particular symbol.

19. The image processing system according to claim 15, wherein the particular symbol is a numeral that indicates an order of the first partial image reproduced.

20. A non-transitory computer-readable medium storing computer-readable instructions that are executable by a processor coupled with an image information acquirer configured to acquire image information of an image read out of a document sheet, the instructions being configured to, when executed by the processor, cause the processor to:

detect a plurality of encircling lines written on the document sheet, based on the acquired image information;

determine an arrangement order of a partial image formed within each of the detected plurality of encircling lines;

detect one or more first symbols each written on the document sheet and added to a corresponding one of the partial images, the one or more first symbols relating to how to lay out the partial images;

determine a layout of the partial images based on the determined arrangement orders and the detected one or more first symbols;

extract, from the acquired image information, a plurality of pieces of image information each of which is image information of the partial image; and generate layout image information in which the extracted plurality of pieces of image information are arranged according to the determined layout.

* * * * *